United States Patent [19]
Nakamura et al.

[11] Patent Number: 5,426,578
[45] Date of Patent: Jun. 20, 1995

[54] GENERATOR HAVING AUTOMATIC PARALLEL OPERATION FUNCTION

[75] Inventors: Masashi Nakamura; Motohiro Shimizu, both of Wako, Japan

[73] Assignee: Honda Giken Kabushiki Kaisha, Tokyo, Japan

[21] Appl. No.: 14,634

[22] Filed: Feb. 8, 1993

[30] Foreign Application Priority Data

Feb. 10, 1992 [JP] Japan .................. 4-057546

[51] Int. Cl.⁶ .......................... H02M 5/45; H02J 1/00
[52] U.S. Cl. ........................................ 363/37; 307/87
[58] Field of Search ..................... 363/34, 37, 40, 41; 322/18, 20, 25, 28; 307/85, 86, 87

[56] References Cited

U.S. PATENT DOCUMENTS

| 3,794,846 | 2/1974 | Schlicher et al. | 307/87 |
| 4,714,869 | 12/1987 | Onitsuka | 307/84 |
| 5,245,522 | 9/1993 | Kawaguchi et al. | 363/37 |
| 5,300,876 | 4/1994 | Takagi | 322/25 |

FOREIGN PATENT DOCUMENTS

| 56-20782 | 5/1981 | Japan | H02J 3/40 |
| 62-145440 | 9/1987 | Japan | H02J 3/38 |

Primary Examiner—R. Skudy
Assistant Examiner—Matthew V. Nguyen
Attorney, Agent, or Firm—Frishauf, Holtz, Goodman & Woodward

[57] ABSTRACT

An invertor-controlled generator unit is connectible with at least one other generator for parallel operation. The invertor-controlled generator has an invertor circuit which performs switching operation to convert a direct current power into an alternating current power based on a reference sinusoidal signal. Voltage and current of the alternating current power from the invertor circuit are detected. A difference in phase between the detected voltage and current is detected, and a signal indicative of the phase difference is formed. A reference pulse signal is formed in response to the signal indicative of the phase difference for varying the frequency of the signal indicative of the target output waveform in a manner such that the phase difference is decreased. Upon starting of the generator, when the above-mentioned voltage is detected, the signal indicative of the target output waveform is generated at timing dependent on the waveform of the detected voltage, whereas when the voltage is not detected, the signal indicative of the target output waveform is generated at timing independent of the voltage.

5 Claims, 21 Drawing Sheets

FIG.2a  a
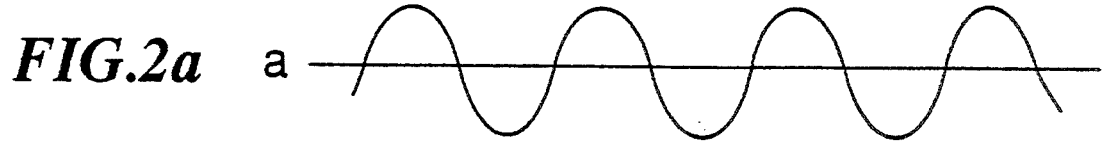
FIG.2b  b
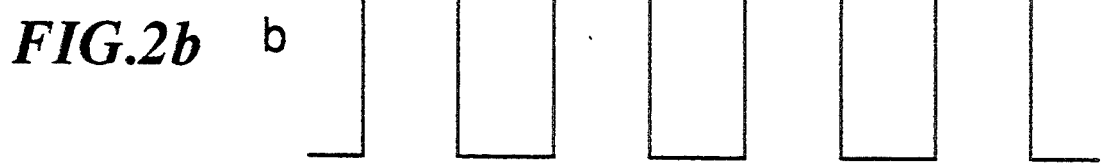
FIG.20a
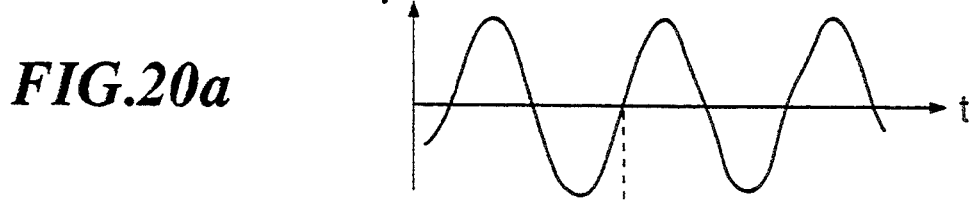
FIG.20b
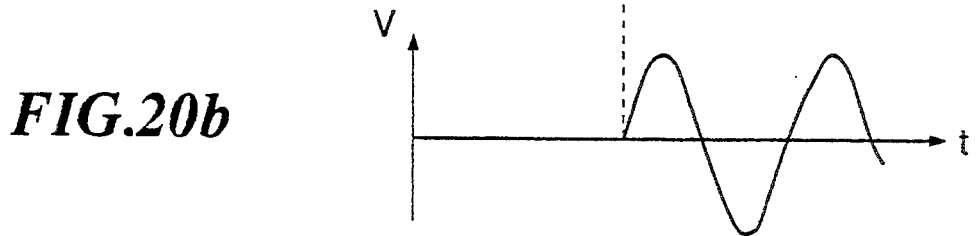

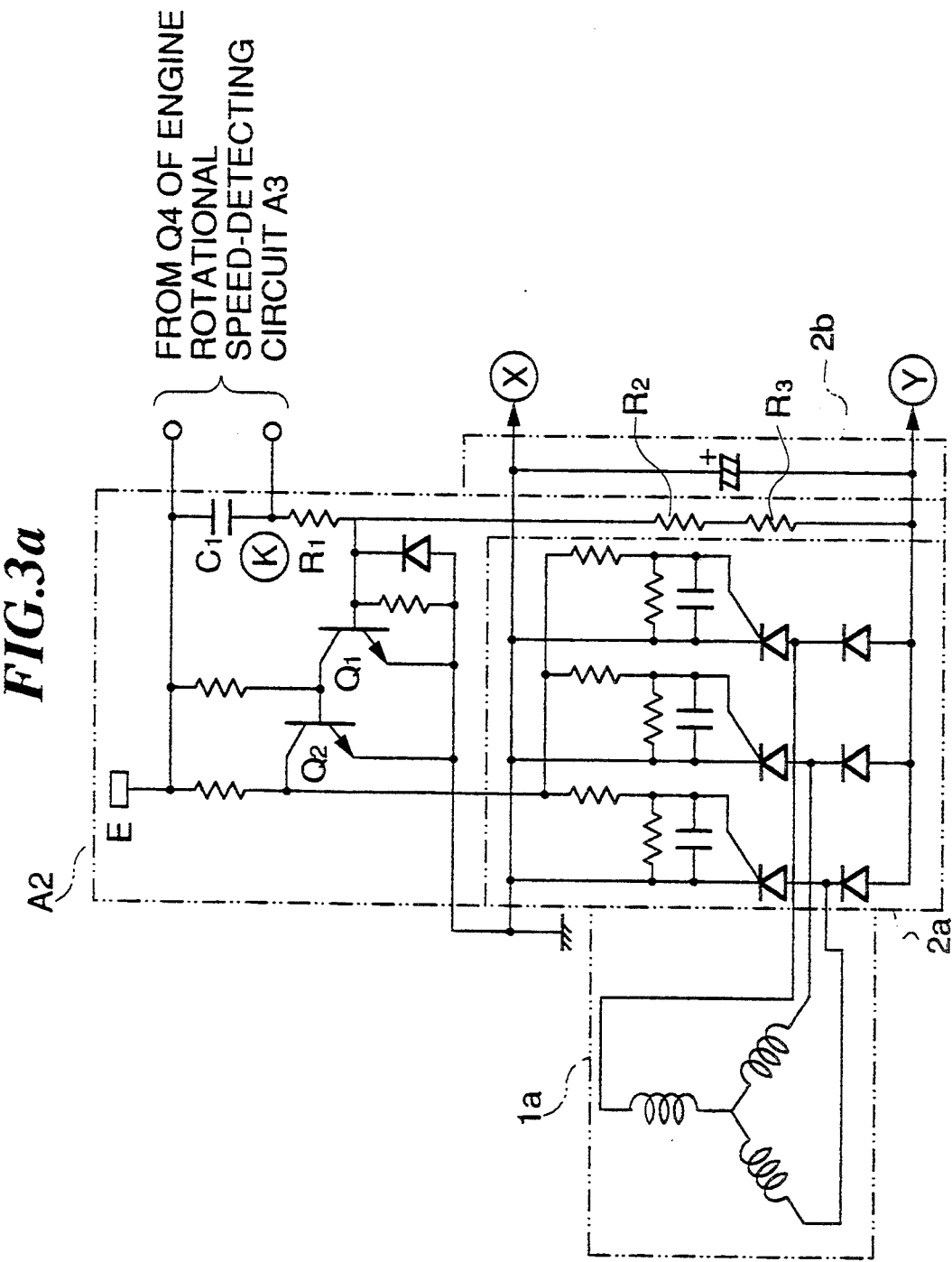

*FIG.16a1* 
*FIG.16a2* 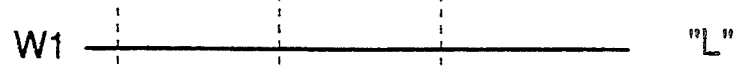
*FIG.16a3* 
*FIG.16a4* 
*FIG.16a5* 
*FIG.16a6* 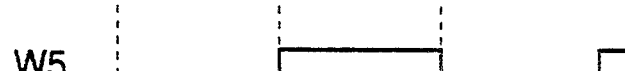
*FIG.16a7* 
*FIG.16a8* 
*FIG.16a9* 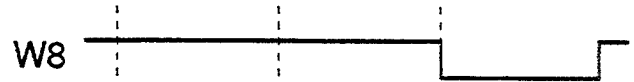
*FIG.16a10* 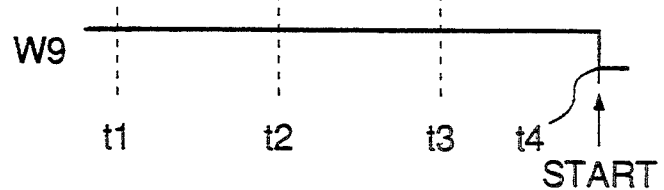

 FIG.16b1  "L"
 FIG.16b2  "H"
 FIG.16b3
 FIG.16b4
 FIG.16b5  "L"
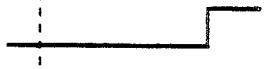 FIG.16b6
 FIG.16b7  "H"
 FIG.16b8
 FIG.16b9
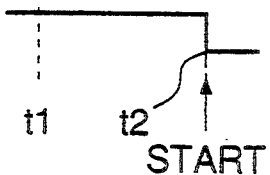 FIG.16b10
t1  t2
START

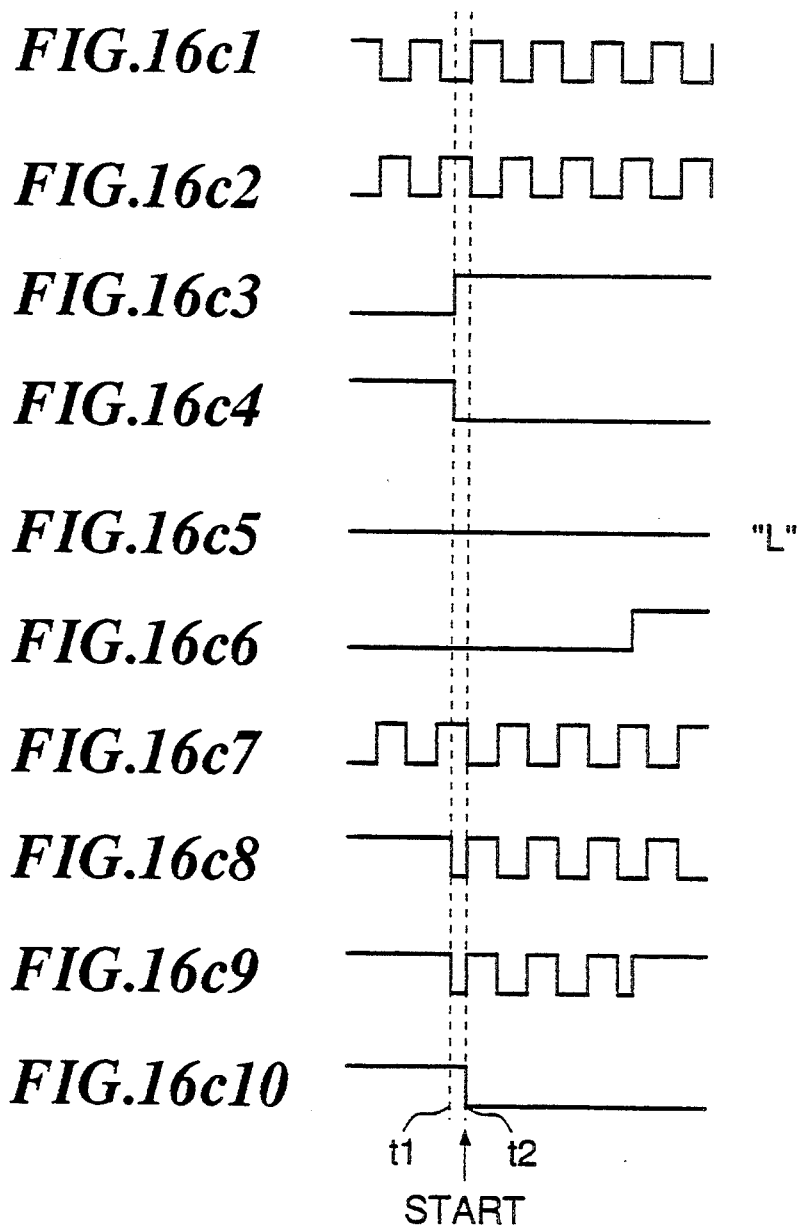

FIG.17a  $\overline{CLK}$
FIG.17b  F1
FIG.17c  F2
FIG.17d  F3

WHEN DETECTED CURRENT LAGS DETECTED VOLTAGE
FIG.18a1  b  
FIG.18a2  b'  
FIG.18a3  S81  
FIG.18a4  SQ̄  
FIG.18a5  S85    "L"
FIG.18a6  S87  
FIG.18a7  S88    "H"
WHEN DETECTED CURRENT LEADS DETECTED VOLTAGE
FIG.18b1  b  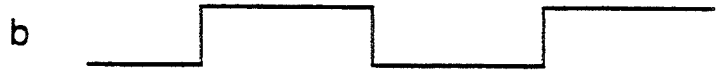
FIG.18b2  b'  
FIG.18b3  S81  
FIG.18b4  SQ̄  
FIG.18b5  S85  
FIG.18b6  S87    "H"
FIG.18b7  S88  

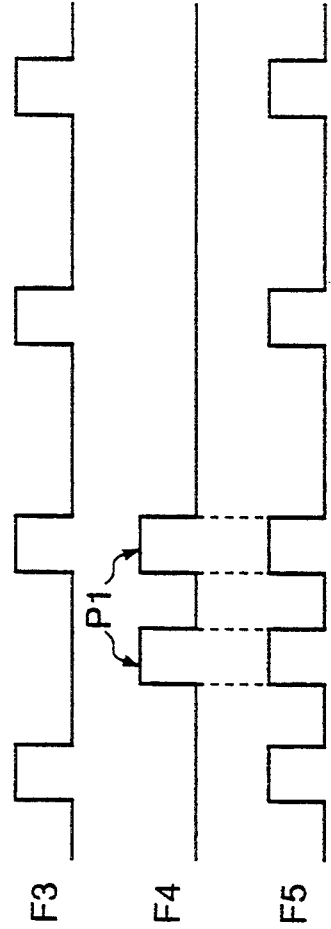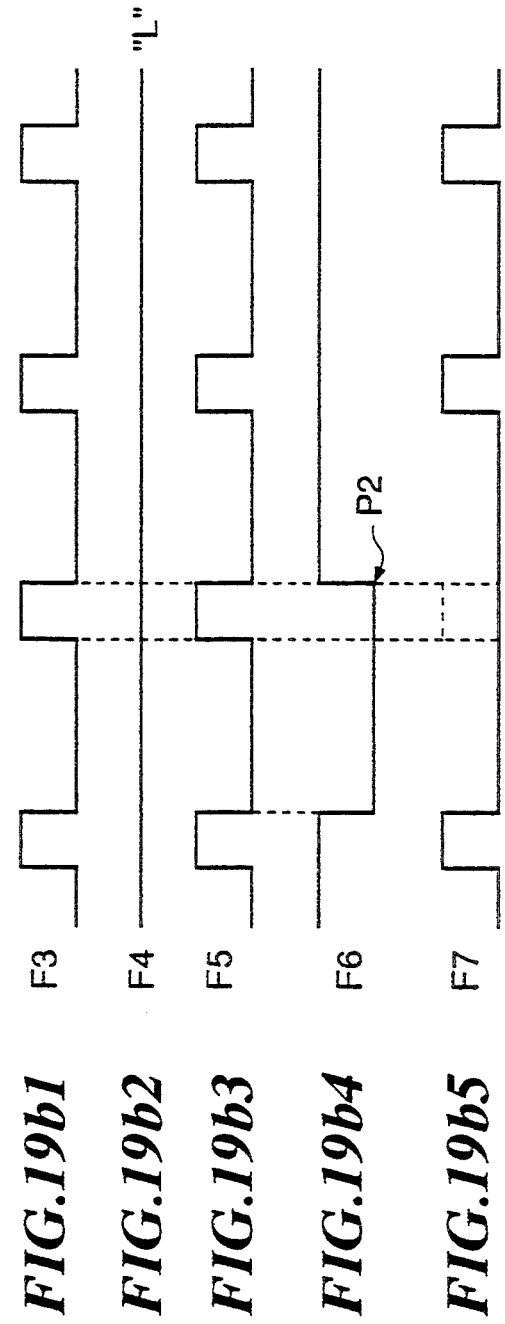

GENERATOR HAVING AUTOMATIC PARALLEL OPERATION FUNCTION

BACKGROUND OF THE INVENTION

1. Field of the Invention

This invention relates to a generator, and more particularly to a generator having the function of automatically adapting itself to parallel operation of a plurality of generators connected in parallel with each other by automatically synchronizing the phases of outputs from the generators.

2. Prior Art

When a plurality of generators connected in parallel with each other are in operation, if the output voltages from the generators are not synchronous with each other, there occurs a difference between the output voltages. This causes a flow of electric current from one generator into another generator, which can result in an excessive amount of current flowing in the one generator. In the worst case, it may destroy component parts thereof. Therefore, it is required to synchronize the output voltages from the generators during parallel operation.

This, however, necessitates providing wiring for transmitting signals for informing each other of operating conditions thereof, even in the case of parallel operation of identically-constructed generators. Alternatively, as disclosed e.g. in Japanese Patent Publication (Kokoku) No. 56-20782, it necessitates employing an automatic synchronizing device and means for producing an operating point at which the phase coincides with each other to cause the automatic synchronizing device to reliably operate shortly after the start thereof. Another solution is to employ a special adaptor for parallel operation of two generators, with one of them serving as a master generator while the other as a slave generator, as disclosed in Japanese Provisional Utility Model Publication (Kokai) No. 62-145440.

SUMMARY OF THE INVENTION

It is the object of the invention to provide a generator which dispenses with the use of special means such as an automatic synchronizing device and a special adaptor for carrying out parallel operation of a plurality of generators.

To attain the object, the present invention provides a generator unit including an alternating current generator, a direct current power source circuit for rectifying and smoothing an output from the alternating current generator into a direct current power and outputting the direct current power, and an invertor circuit for converting the direct current power from the direct current power source circuit into an alternating current power having a predetermined frequency, the generator unit being connectible with at least one generator unit for parallel operation therewith.

The generator unit according to the invention is characterized by comprising:

target waveform-forming means for forming a signal indicative of a target output waveform for the alternating current power having the predetermined frequency, the signal serving as a reference sinusoidal signal for switching operation of the invertor circuit;

output voltage-detecting means for detecting voltage of the alternating current power from the invertor circuit;

output current-detecting means for detecting current of the alternating current power from the invertor circuit;

phase difference-detecting means for detecting a difference in phase between the voltage detected by the output voltage-detecting means and the current detected by the output current-detecting means, and outputting a phase difference signal indicative of the detected phase difference;

reference pulse signal-forming means responsive to the phase difference signal from the phase difference-detecting means for forming a reference pulse signal for varying frequency of the signal indicative of the target output waveform in a manner such that the phase difference detected by the phase difference-detecting means is decreased; and a start timing-controlling circuit for causing the target waveform-forming circuit to output the signal indicative of the target output waveform at timing dependent on a waveform of the voltage when the voltage is detected upon starting of operation of the invertor circuit, while causing the target output waveform-forming circuit to output the signal indicative of the target output waveform at timing independent of the waveform of the voltage when the voltage is not detected upon starting of operation of the invertor circuit.

Preferably, the start timing-controlling circuit is capable of determining both the timing dependent on the waveform of the voltage detected by the output voltage-detecting means and the independent timing, and operating on both of the dependent timing and the independent timing to actuate the target output waveform-forming means, upon starting of operation of the invertor circuit, the independent timing having a frequency lower than the predetermined frequency of the output power.

More preferably, the reference pulse signal-forming means generates the reference pulse signal in a manner such that a new pulse is added to a reference pulse train having a predetermined frequency for forming the reference pulse signal when the current detected by the output current-detecting means lags in phase relative to the voltage detected by the output voltage-detecting mans, whereas a pulse is subtracted from the reference pulse train for forming the reference pulse signal when the current detected by the output current-detecting means leads in phase the voltage detected by the output voltage-detecting means, whereby the frequency of the target output waveform is varied so as to decrease the phase difference.

Further preferably, the reference pulse signal-forming means adds the new pulse to or subtracts the pulse from the reference pulse train at predetermined intervals of time.

The above and other objects, features, and advantages of the invention will become more apparent from the following detailed description taken in conjunction with the accompanying drawings.

BRIEF DESCRIPTION OF THE DRAWINGS

FIG. 2a and FIG. 2b form a timing chart useful in explaining the operation of the generator shown in FIG. 1, in which:

FIG. 2a shows a waveform of an output voltage signal a from a voltage detector appearing in FIG. 1; and FIG. 2b shows a waveform of a rectangular wave signal a from a rectangular wave-forming circuit appearing in FIG. 1;

FIG. 3a is a circuit diagram showing details of part of an alternating current generator, and a rectifying/smoothing circuit, both appearing in FIG. 1, and a thyristor control circuit associated therewith, as component parts of the generator of FIG. 1;

FIG. 16a1 to FIG. 16a10, FIG. 16b1 to FIG. 16b10, and FIG. 16c1 to FIG. 16c10 collectively form respective timing charts useful in explaining the operation of the rise timing-controlling circuit of FIG. 10 when the signal b supplied from the first-mentioned rectangular wave-forming circuit thereto is at a high level, at a low level, and assumes a rectangular waveform based on the output voltage from a counterpart generator, respectively, in which:

FIG. 16a1, FIG. 16b1, and FIG. 16c1 show waveforms of the signal b;

FIG. 16a2, FIG. 16b2, and FIG. 16c2 show waveforms of a signal W1 appearing in FIG. 10;

FIG. 16a3, FIG. 16b3, and FIG. 16c3 show waveforms of a signal W2 appearing in same;

FIG. 16a4, FIG. 16b4, and FIG. 16c4 show waveforms of a signal W3 appearing in same;

FIG. 16a5, FIG. 16b5, and FIG. 16c5 show waveforms of a signal W4 appearing in same;

FIG. 16a6, FIG. 16b6, and FIG. 16c6 show waveforms of a signal W5 appearing in same;

FIG. 16a7, FIG. 16b7, and FIG. 16c7 show waveforms of a signal W6 appearing in same;

FIG. 16a8, FIG. 16b8, and FIG. 16c8 show waveforms of a signal W7 appearing in same;

FIG. 16a9, FIG. 16b9, and FIG. 16c9 show waveforms of a signal W8 appearing in same; and FIG. 16a10, FIG. 16b10, and FIG. 16c10 show waveforms of a signal W9 appearing in same;

FIG. 17a to FIG. 17d collectively form a timing chart useful in explaining the operation of the oscillator of FIG. 1, in which:

FIG. 17a shows a waveform of a clock input signal CLK-bar supplied to a counter of the oscillator of FIG. 11;

FIG. 17b shows a waveform of a signal F1 appearing in FIG. 11;

FIG. 17c shows a waveform of a signal F2 appearing in same; and

FIG. 17d shows a waveform of a signal F3 appearing in same;

FIG. 18a1 to FIG. 18a7 and FIG. 18b1 to FIG. 18b7 form timing charts useful in explaining the operation of the phase difference detector of FIG. 9 when a current detected by the current detector appearing in FIG. 1 lags a voltage detected by the voltage detector appearing in FIG. 1, and when the former leads the latter, in which:

FIG. 18a1 and FIG. 18b1 show waveforms of the signal b;

FIG. 18a2 and FIG. 18b2 show waveforms of a signal b' from the second-mentioned rectangular wave-forming circuit 7;

FIG. 18a3 and FIG. 18b3 show waveforms of a signal S81 appearing in FIG. 9;

FIG. 18a4 and FIG. 18b4 show waveforms of a signal SQ-bar appearing in same;

FIG. 18a5 and FIG. 18b5 show waveforms of a signal S85 appearing in same;

FIG. 18a6 and FIG. 18b6 show waveforms of a signal S87 appearing in same; and

FIG. 18a7 and FIG. 18b7 show waveforms of a signal S88 appearing in same;

FIG. 19a1 to FIG. 19a3 and FIG. 19b1 to FIG. 19b5 collectively show timing charts useful in explaining the operation of the oscillator of FIG. 11 when the current detected by the current detector lags the voltage detected by the voltage detector, and when the former leads the latter, respectively, in which:

FIG. 19a1 and FIG. 19b1 show waveforms of the signal F3 appearing in FIG. 11;

FIG. 19a2 and FIG. 19b2 show waveforms of a signal F4 appearing in same;

FIG. 19a3 and FIG. 19b3 show waveforms of a signal F5 appearing in same;

FIG. 19b4 shows a waveform of a signal F6 appearing in same; and

FIG. 19b5 shows a waveform of a signal F7 appearing in same; and

FIG. 20a and FIG. 20b collectively form a timing chart useful in explaining a manner of rise of output voltage of the generator according to the invention started for parallel operation, in which:

FIG. 20a shows a waveform of output voltage from the counterpart generator; and

FIG. 20b shows a waveform of output voltage from the present generator.

DETAILED DESCRIPTION

The invention will now be described in detail with reference to the drawings showing an embodiment thereof.

Figure 1:
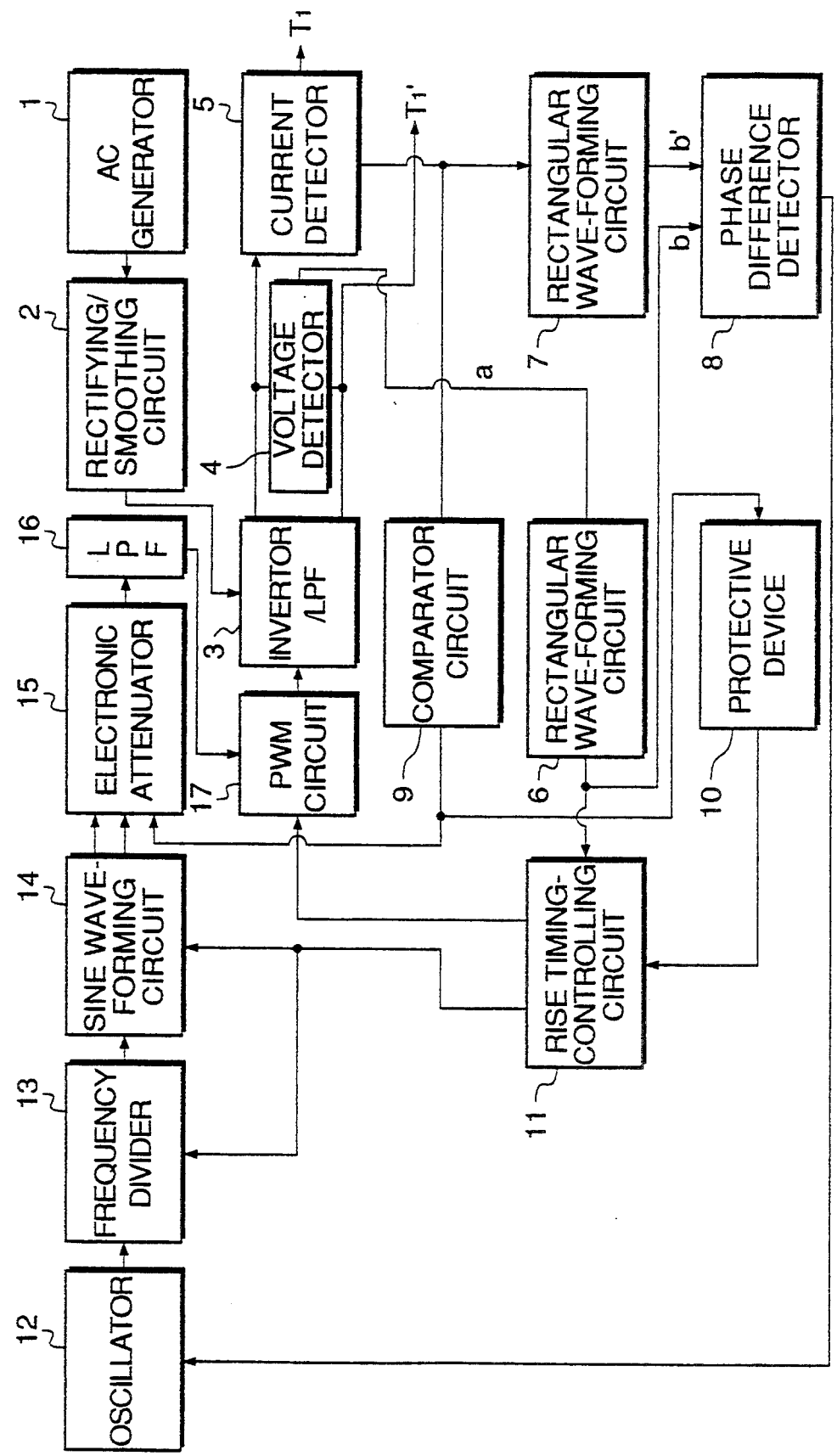
FIG. 1 is a circuit diagram schematically showing the whole arrangement of a generator according to an embodiment of the invention.

Referring first to FIG. 1, there is shown the whole arrangement of a small-sized portable generator to which is applied the present invention. In the figure, reference numeral 1 designates an AC generator which has its output connected to the input of a rectifying/smoothing circuit 2. The output of the rectifying/smoothing circuit 2 is connected to the input of an invertor circuit/low-pass filter (hereinafter referred to as "the invertor/LPF") 3. The outputs of the invertor/LPF 3 are connected via a voltage detector 4 and a current detector 5 to output terminals T1, T1'.

The output of the voltage detector 4 is connected to the input of a rectangular wave-forming circuit 6, while the output of the current detector 5 is connected to the input of a rectangular wave-forming circuit 7. The output of the voltage detector 4 and the output of the current detector 5 are connected to the input of a phase difference detector 8 via the rectangular wave-forming circuits 6 and 7, respectively. The output of the current detector 5 is connected via a comparator circuit 9 and a protective device 10 to the input of a rise timing-controlling circuit 11. The output of the phase difference detector 8 is connected via an oscillator (basic pulse signal-forming circuit) 12, a frequency divider 13, a sine wave-forming circuit 14 for forming a target waveform signal, an electronic attenuator 15, a low-pass filter (hereinafter referred to as "the LPF") 16, and a pulse width-modulating circuit (hereinafter referred to as "the PWM circuit") 17, to the invertor/LPF 3. Further, the output of the comparator circuit 9 is connected to the electronic attenuator 15, and the output of the rise timing-controlling circuit 11 is connected to the input of the frequency divider 13, the input of the sine wave-forming circuit 14 and the input of the PWM circuit 17.

Next, the operation of the generator of FIG. 1 constructed as above will be briefly described with reference to FIG. 2a and FIG. 2b.

Alternating current generated by the AC generator 1 is rectified and smoothed by the rectifying/smoothing circuit 2 into direct current power. The direct current power is converted by the invertor/LPF 3, which is controlled by the PWM circuit 17, into alternating current power having a predetermining frequency, e.g. 50 Hz or 60 Hz, which is then supplied through output lines via the output terminals T1, T1' to a load. Output voltage between the output lines is detected by the voltage detector 4, which supplies an output voltage signal a having a sinusoidal waveform as shown in FIG. 2a to the rectangular wave-forming circuit 6. The sinusoidal output voltage signal a is converted into a rectangular wave signal b as shown in FIG. 2b by the rectangular wave-forming circuit 6 and then supplied to the rise timing-controlling circuit 11 and the phase difference detector 8. The rectangular wave-forming circuit 7 forms a rectangular wave signal b', which is similar to the signal b, based on an output current signal from the current detector 5 and supplies same to the phase difference detector 8.

The phase difference detector 8 supplies signals dependent on the difference in phase between the output from the present generator and the output from a counterpart generator connected thereto for parallel operation to the oscillator 12, to control an output therefrom. More specifically, the phase difference detector 8 compares the phase of the output from the present generator and that of the counterpart generator by the use of the signals b and b' to detect an advance or a lag of the former relative to the latter, and supplies results of the comparison in the form of a phase advance signal indicative of an advance of the former relative to the latter or a phase lag signal indicative of a lag of the former relative to the latter, to the oscillator 12 to perform fine-adjustment of the frequency of a pulse train outputted from the oscillator 12. The pulse train from the oscillator 12 is divided by the frequency divider 13 and the divided pulse signal is supplied as a clock signal to the sine wave-forming circuit 14. The sine wave-forming circuit 14 forms, by the use of the clock signal, a sine wave signal having a stepped waveform, which is supplied to the electronic attenuator 15. The electronic attenuator 15 controls stoppage and passage of the sine wave signal therethrough, as well as the degree of attenuation of same during the passage, particularly when the generator is in an over load current condition, and the resulting sine wave signal is supplied via the LPF 16 to the PWM circuit 17, which in turn generates a pulse signal which is pulse width-modulated by the sine wave signal having a predetermined frequency as a target waveform signal.

The pulse signal from the PWM circuit 17 controls the operation of gates of FET's (field effect transistors) Q5 to Q8 of a bridge invertor circuit of the invertor/LPF 3 to convert the direct current power from the rectifying/smoothing circuit 2 into alternating current power which corresponds in waveform to the target waveform signal having the predetermined frequency, i.e. the sine wave signal from the LPF 16. The resulting alternating current power is supplied via the output terminals T1, T1' to the load connected to the generator.

The component parts and elements of the generator according to the invention, appearing in FIG. 1, will now be described in detail with reference to FIGS. 3a and 3b to FIG. 15.

Figure 3B:
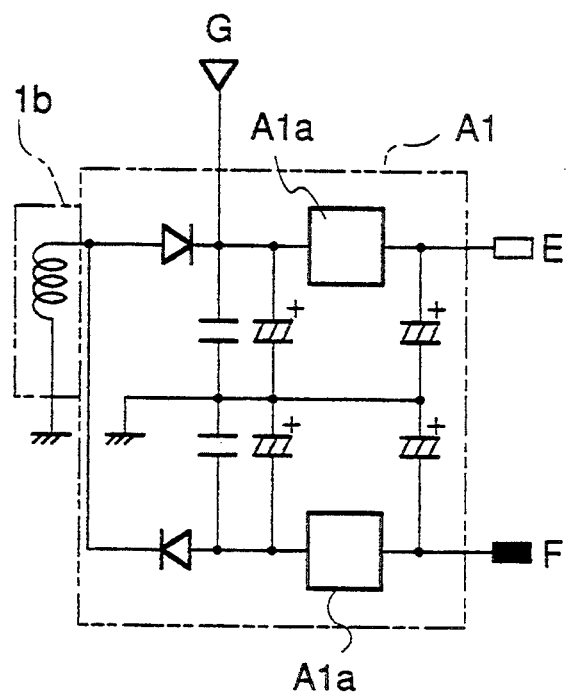
FIG. 3b is a circuit diagram showing an example of a constant-voltage regulator circuit, etc., as component parts of the generator of FIG. 1.

In FIG. 3a, reference numeral 1a designates, a three-phase output winding having coils separately wound on a common stator core, not shown, of the AC generator 1, and in FIG. 3b, reference numeral 1b designates a single-phase auxiliary winding wound on the above common stator. A magnet rotor, not shown, having a plurality of magnetic poles is arranged to be rotatively driven by an engine, not shown. The three-phase output winding 1a has its output connected to a bridge rectifier 2a comprised of three thyristors and three diodes, which in turn has its output connected to a smoothing circuit 2b. The bridge rectifier 2a and the smoothing circuit 2b cooperatively form the rectifying/smoothing circuit 2.

The single-phase auxiliary winding 1b has its output connected to a constant-voltage regulator circuit A1 having positive and negative output terminals E and F. The constant-voltage regulator circuit A1 has two sets of rectifiers, smoothing circuits, and constant-voltage regulators A1a, one set being operable in response to current flowing in one direction from the auxiliary winding 1b, the other set in response to current flowing in the other direction from the winding 1b so that the output terminals E, F supply positive constant voltage and negative constant voltage, respectively.

Reference numeral A2 designates a thyristor control circuit which is formed of a capacitor C1, resistances R1 to R3, transistors Q1 and Q2, etc., and controls input signals to gate input circuits of thyristors of the bridge rectifier 2a according to a potential at a junction between the resistances R1 and R2. The thyristor control circuit A2 has a power source-input terminal connected to the positive output terminal E of the constant-voltage regulator circuit A1, and another terminal grounded together with a positive terminal of the smoothing circuit 2b, while a junction K between the capacitor C1 and the resistance R1 is connected to the output of an engine rotational speed-detecting circuit A3 shown in FIG. 4.

The engine rotational speed-detecting circuit A3 is formed of a Zener diode D1 connected to an input terminal G of the constant-voltage regulator A1aprovided on the positive output terminal E side of the constant-voltage regulator circuit A1, an inverting comparator A3a, a NOR gate A3b, an invertor A3c, transistors Q3, Q4, a capacitor C2, a diode D2, etc. The circuit A3 operates such that when the rotational speed of the engine exceeds a predetermined value, the potential at an emitter of the transistor Q4 on the output side goes high, while the former is lower than the latter, the potential goes low. The Zener diode D1 has its anode connected via resistances to the negative output terminal F of the constant-voltage regulator circuit A1. The NOR gate A3b has its input connected to the protective device 10 formed of a counter, etc., for detecting an overcurrent state of the generator, which device supplies a high level signal to the NOR gate A3b when the counter has counted a predetermined number of pulses supplied thereto (when circuit protection of the generator is required). Further, the transistor Q4 has its collector connected to the positive output terminal E of the constant-voltage regulator circuit A1 and its emitter connected to the aforementioned junction K of the thyristor control circuit A2.

Figure 5:
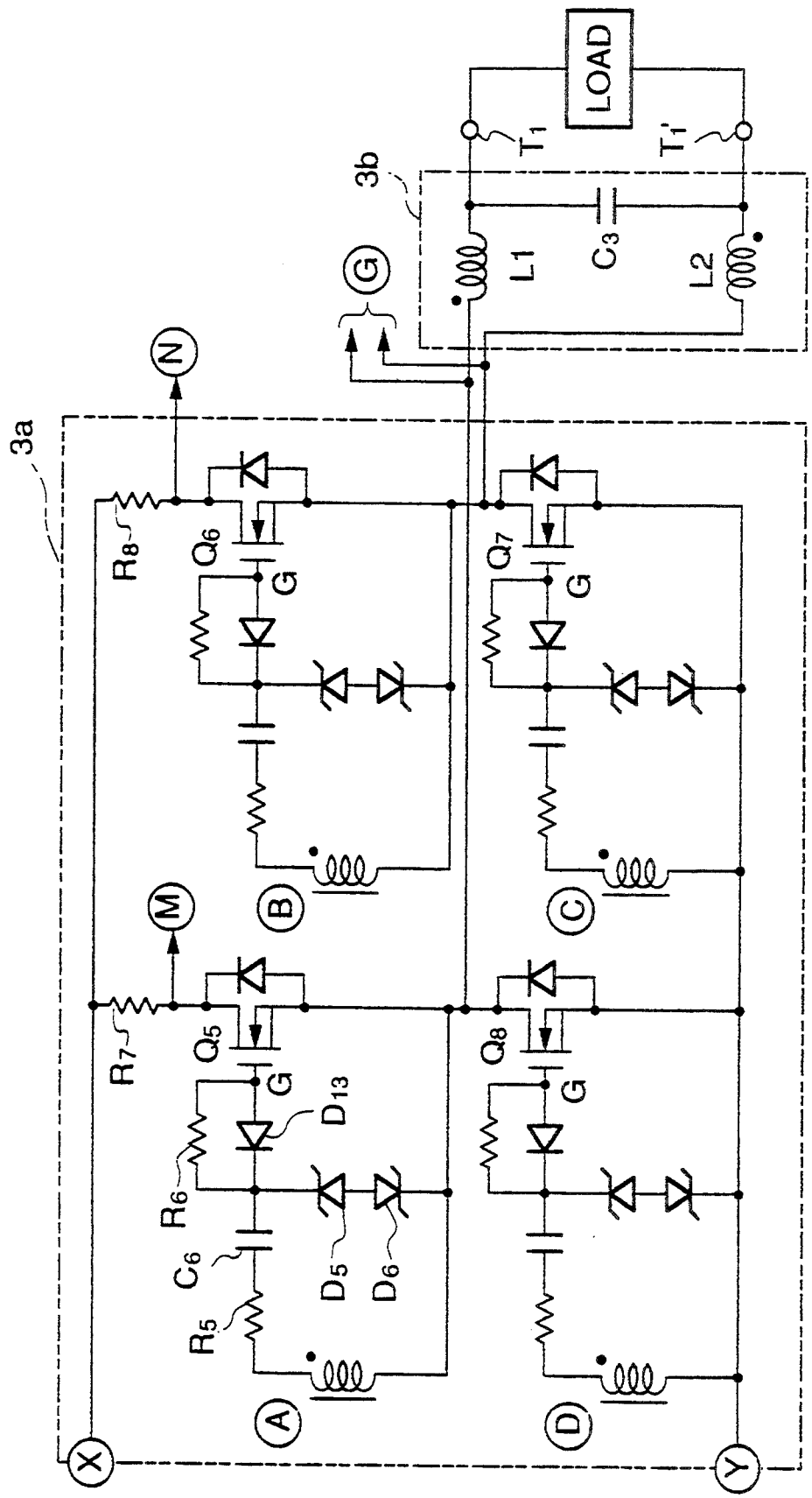
FIG. 5 is a circuit diagram showing details of an invertor circuit/LPF appearing in FIG. 1.

The smoothing circuit 2b has its output connected to an invertor circuit 3a shown in FIG. 5. The invertor circuit 3a is formed by a bridge circuit composed of the aforementioned four FET's (field effect transistors) Q5 to Q8 as switching elements. Resistances R7 and R8 for detecting current are connected between drains of the respective FET's Q5 and Q6 and the positive output line of the smoothing circuit 2b. The invertor circuit 3a has its output connected via a low-pass filter (LPF) 3b to the output terminals T1, T1' through which alternating current power is supplied to the load. The LPF 3b is formed of coils L1 and L2 connected in series to the load, and a capacitor C3 connected in parallel with the load. The invertor circuit 3a and the LPF 3b cooperate to form the invertor/LPF 3. Junctions M and N between the resistances R7 and R8 and the respective FET's Q5 and Q6 are connected to the current detector 5.

Figure 6:
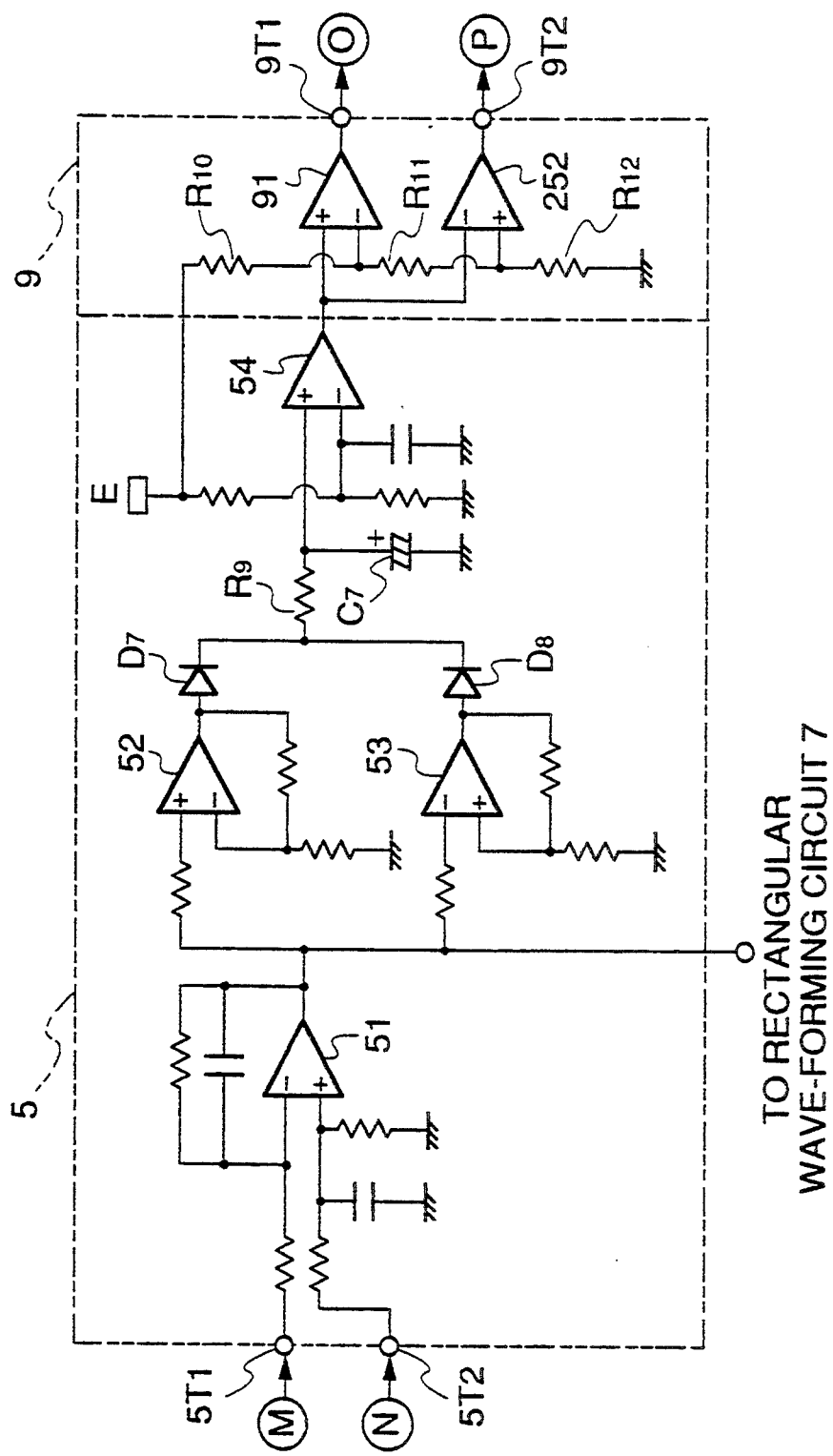
FIG. 6 is a circuit diagram showing details of a current detector and a comparator circuit appearing in FIG. 1.

Next, reference is made to FIG. 6, showing the current detector 5. The current detector 5 is comprised of an operational amplifier 51 which inverts an input signal from the junction N, adds the inverted signal to an input signal from the junction M, and amplifies the resulting composite signal to form a signal having a sinusoidal waveform, operational amplifiers 52, 53, and diodes D7, D8 for full-wave rectification of the sinusoidal output signal from the operational amplifier 51, a resistance R9 and a capacitor C7 for smoothing an output signal from the diode D7 or D8, and an operational amplifier 54 for amplifying the smoothed output signal. The current detector 5 has its output connected to the input of the rectangular wave-forming circuit 7 as well as to the input of the comparator circuit 9 in FIG. 6.

As shown in FIG. 6, the comparator circuit 9 is formed of comparators 91, 92, and resistances R10, R11, R12 connected in series between the positive output terminal E of the constant-voltage regulator circuit A1 and ground. Junctions between the resistances R10 and R11 and between the resistances R11 and R12 provide threshold values for the comparators 91 and 92, respectively. The comparator 91 supplies a high level output through an output terminal 9T1 only when the output voltage from the current detector 5 exceeds the threshold value of the comparator 91, while the comparator 92 supplies a high level output through an output terminal 9T2 only when the output voltage from the current detector 5 exceeds the threshold value of the comparator 92. The output terminals 9T1 and 9T2 of the comparator circuit 9 are connected to a control input terminal of the electronic attenuator 15.

Figure 7:
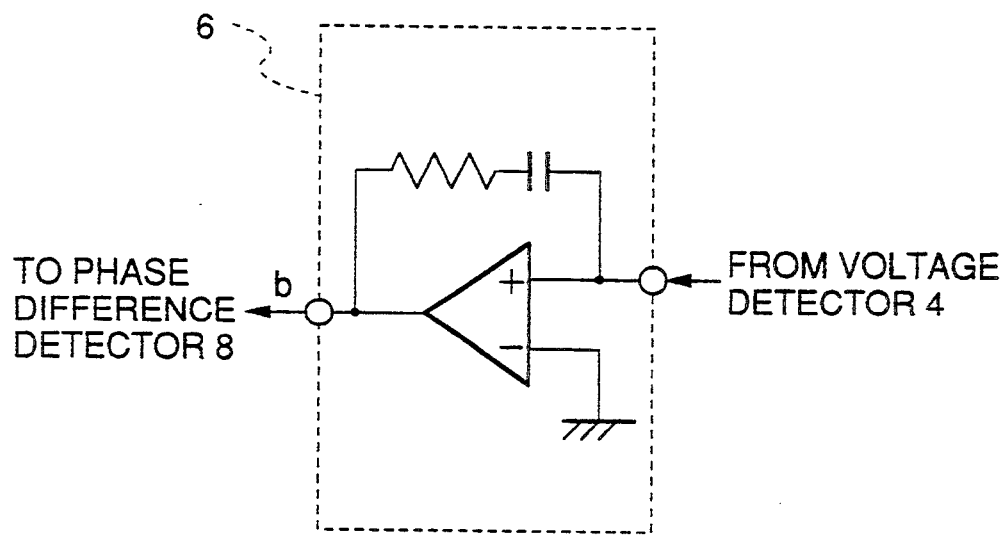
FIG. 7 is a circuit diagram showing details of the aforementioned rectangular wave-forming circuit appearing in FIG. 1.
Figure 8:
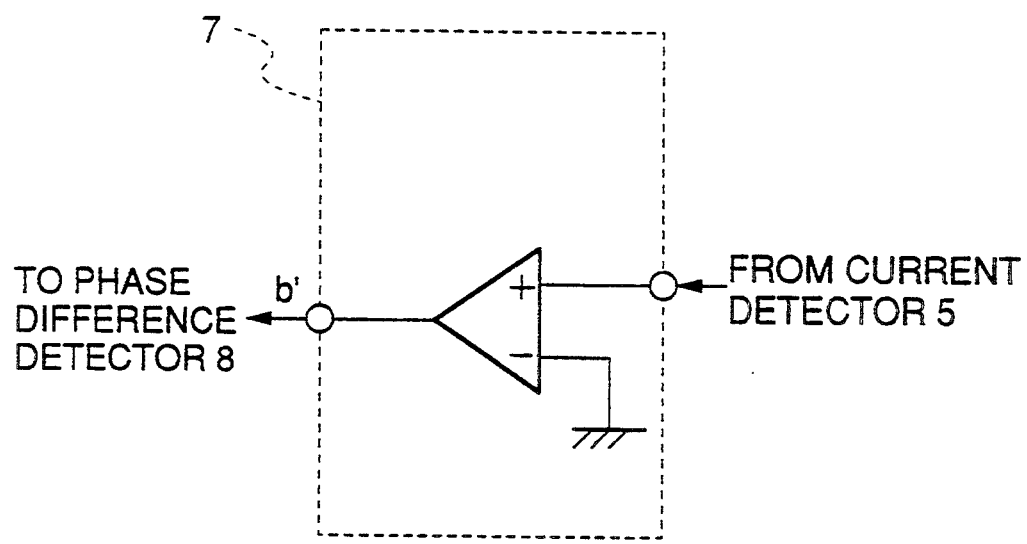
FIG. 8 is a circuit diagram showing details of another rectangular wave-forming circuit appearing in FIG. 1.

On the other hand, the rectangular wave-forming circuits 6, 7 are constructed as shown in FIG. 7 and FIG. 8, respectively.

The rectangular wave-forming circuit 6 is formed by a positive feedback amplifier circuit having an operational amplifier. The circuit 6 is supplied with a sinusoidal wave signal corresponding in phase to that of the AC output voltage, which is generated from the voltage detector 4, referred to hereinafter with reference to FIG. 15, to amplify the sinusoidal wave signal in a positive feedback manner into the aforementioned rectangular wave signal b having a steep rise and fall characteristic. The rectangular wave-forming circuit 7 is formed by an operational amplifier having a high amplification factor. The circuit 7 is supplied with a sinusoidal wave signal corresponding in phase to load current, which is generated from the current detector 5 to amplify the sinusoidal wave signal into the aforementioned signal b' having a steep rise and fall characteristic.

Figure 9:
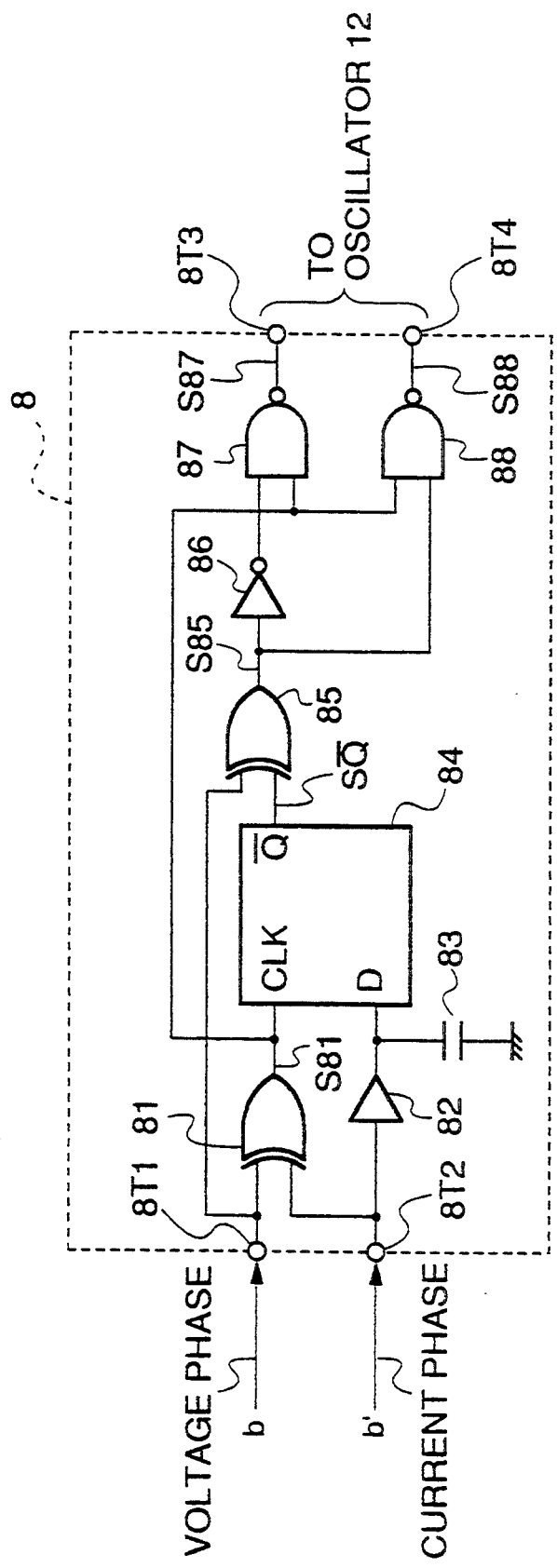
FIG. 9 is a circuit diagram showing details of a phase difference detector appearing in FIG. 1.

FIG. 9 shows, by way of example, details of the phase difference detector 8 appearing in FIG. 1.

The phase difference detector 8 has an exclusive OR circuit (hereinafter referred to as "the XOR gate") 81, which has its input supplied with the rectangular wave signals b, b' from the rectangular wave-forming circuits 6 and 7 via input terminals 8T1, 8T2, respectively. Further, the rectangular wave signal b' from the rectangular wave-forming circuit 7 is supplied via a buffer 82 to a data input terminal D of a D flip-flop 84. A capacitor 83 is connected between the output of the buffer 82 and ground.

The XOR gate 81 has its output connected to a clock input terminal CLK of the D flip-flop 84, which in turn has its output terminal Q-bar connected to an input of an XOR gate 85. The XOR gate 85 is supplied with the rectangular wave signal b as well. The XOR gate 85 has its output connected via an invertor 86 to an input of a NAND gate 87, and directly to an input of a NAND gate 88. Further, the output of the XOR gate 81 is directly connected to the input of the NAND gate 87 and the input of the NAND gate 88. The NAND gates 87, 88 have their outputs connected via respective output terminals 8T3, 8T4 to the oscillator 12 appearing in FIG. 1.

Figure 10:
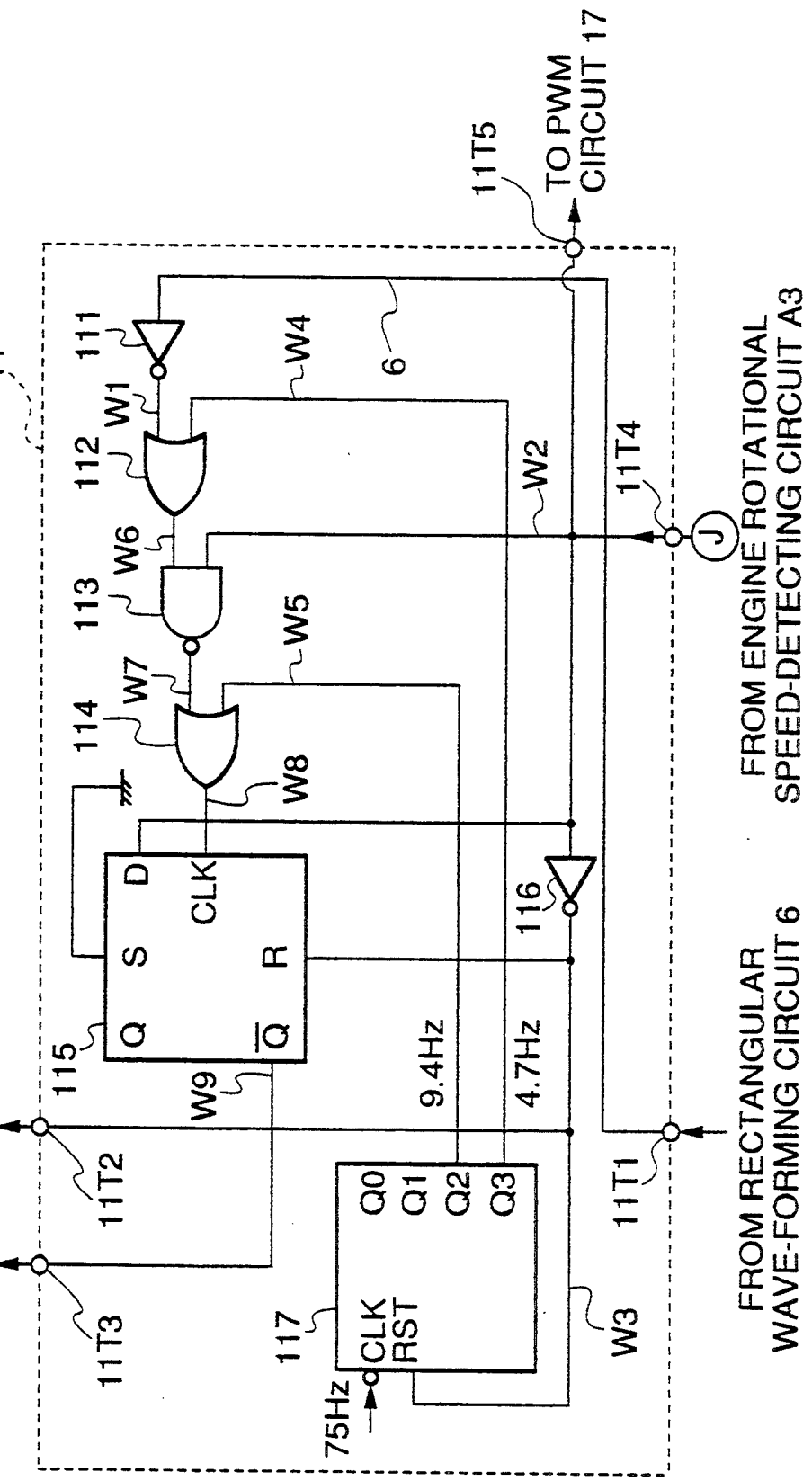
FIG. 10 is a circuit diagram showing details of a rise timing-controlling circuit appearing in FIG. 1.

The rise timing-controlling circuit 11 appearing in FIG. 1 is constructed as shown in FIG. 10.

The rise timing-controlling circuit 11 has an invertor 111 connected via an input terminal 11T1 to the output of the rectangular wave-forming circuit 6. The invertor 111, an OR gate 112, a NAND gate 113 and an OR gate 114 are connected in series as shown in the figure. The OR gate 114 has its output connected to a clock input terminal CLK of a D flip-flop 115. Further, the D flip-flop 115 has a data input terminal D connected via an invertor 116 to a reset terminal R of the D flip-flop terminal 115 and to the sine wave-forming circuit 14 via an output terminal 11T2, and an output terminal Q-bar connected via an output terminal 11T3 to the sine wave-forming circuit 14 and the frequency divider 13.

Further, the invertor 116 has its output connected to a reset terminal RST of a binary counter 117 as well. The counter 117 has a clock input terminal CLK supplied with a pulse signal having a frequency of 75 Hz, which is formed by dividing a pulse train generated by the oscillator 12 and having a constant frequency, an output terminal Q2 connected to an input of the OR gate 114, and an output terminal Q3 connected to an input of the OR gate 112. Further, the output of the NOR gate A3b of the engine rotational speed-detecting circuit A3 connected to the protective device 10 shown in FIG. 10 is connected via an input terminal 11T4 to an input of the NAND gate 113 and an input of the invertor 116, and via an output terminal 11T5 to the PWM circuit 17.

Figure 11:
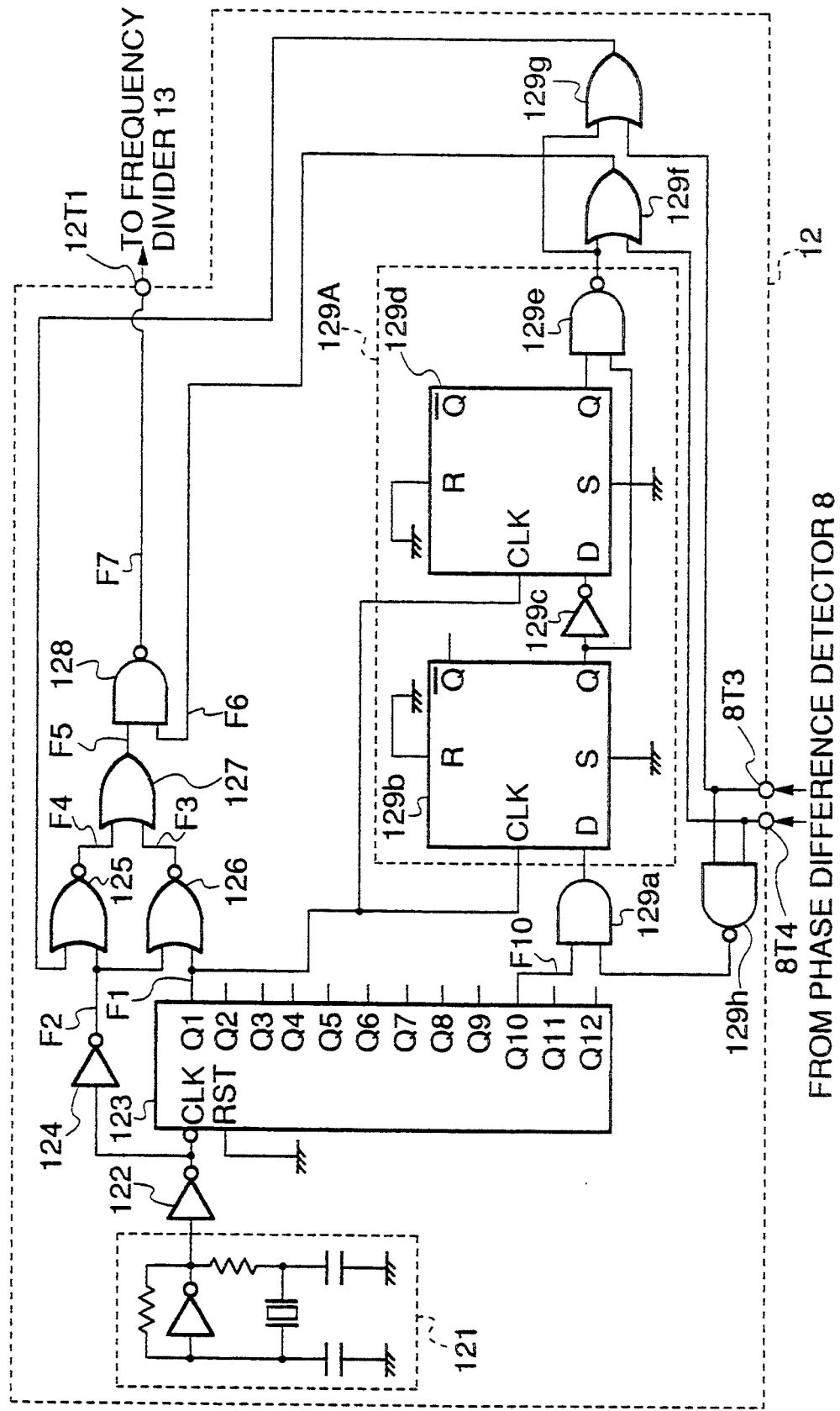
FIG. 11 is a circuit diagram showing details of an oscillator appearing in FIG. 1.

FIG. 11 shows, by way of example, details of the oscillator 12 as a basic pulse signal-forming circuit.

The oscillator 12 has a voltage-controlled type oscillator (hereinafter referred to as "the VCO") 121 formed of a crystal oscillator or the like. The VCO 121 has its output connected via an invertor 122 to a clock input terminal CLK of a counter 123. The counter 123 is formed by a binary ripple counter having output terminals Q1 to Q12, with its reset terminal RST grounded. Further, the invertor 122 has its output connected via an invertor 124 to an input of a NOR gate 125 and an input of a NOR gate 126. The NOR gates 125, 126 have their outputs connected via an OR gate 127 to an input of a NAND gate 128. The NAND gate 128 has its output connected via an output terminal to the frequency divider 13 appearing in FIG. 1.

On the other hand, the counter 123 has an output terminal Q10 connected to an input of an AND gate 129a, which in turn has its output connected to a data input terminal D of a D flip-flop 129b. The D flip-flop 129b has an output terminal Q connected via an invertor 129c to a data input terminal D of a D flip-flop 129d. An output terminal Q of the D flip-flop 129d and the output terminal Q of the D flip-flop 129b are connected to the input of a NAND gate 129e. The D flip-flop 129b, invertor 129c, D flip-flop 129d and NAND gate 129e cooperate to constitute a conventional typical one-shot multivibrator 129A. The one-shot multivibrator 129A has its output, i.e. the output of the NAND gate 129e connected to an input of an OR gate 129f and an input of an OR gate 129g. The OR gate 129g has its output connected to another input of the NOR gate 125. The output terminals 8T3, 8T4 of the phase difference detector 8 are connected to an input of a NAND gate 129h, which in turn has its output connected to another input of the AND gate 129a. Further, the output terminal 8T3 is also connected to another input of the OR gate 129g, while the output terminal 8T4 is also connected to another input of the input of the OR gate 129f. The oscillator 12 constructed as above generates a basic pulse signal from which a target output waveform signal, referred to hereinafter, is to be formed.

Figure 12:
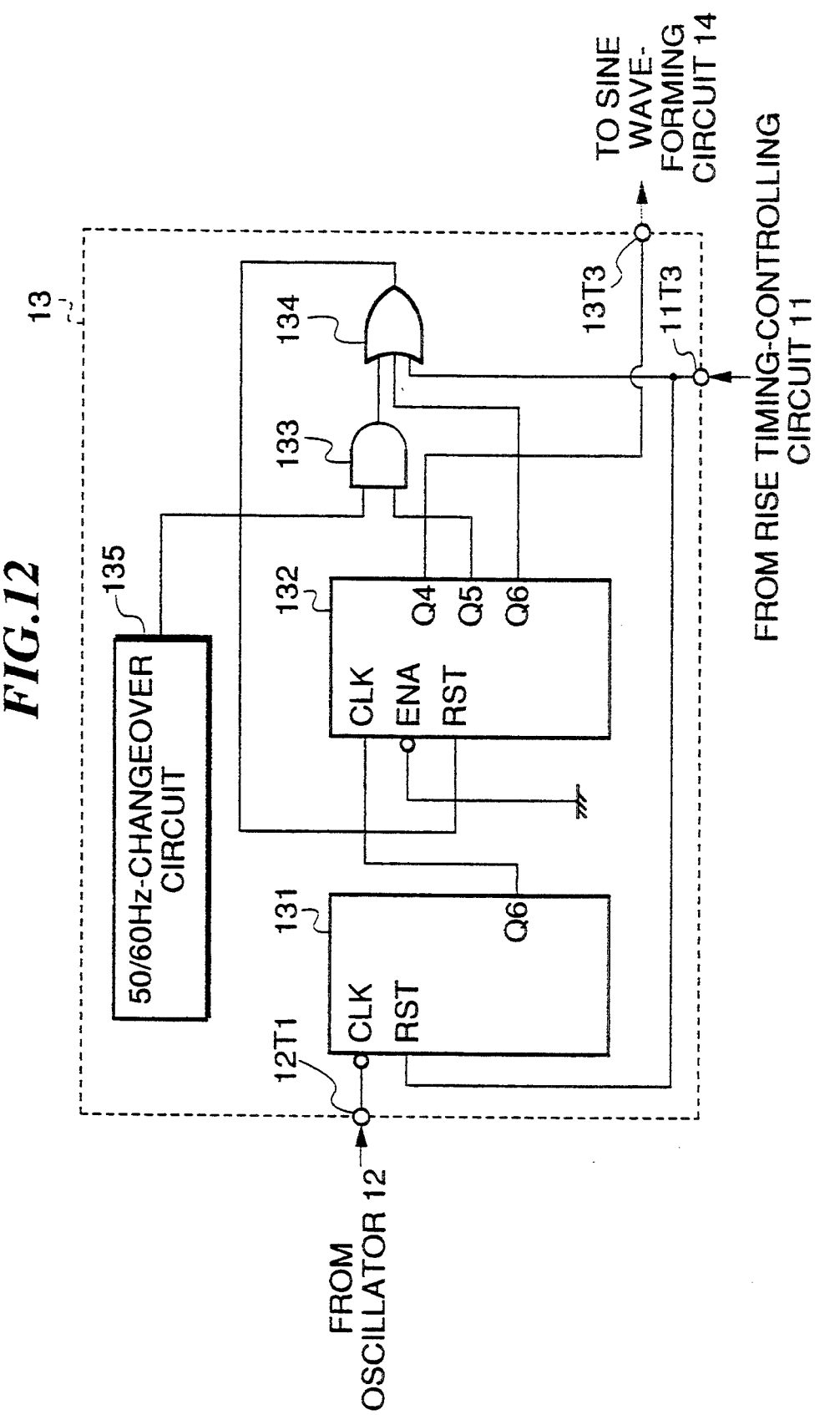
FIG. 12 is a circuit diagram showing details of a frequency divider appearing in FIG. 1.

FIG. 12 shows, by way of example, details of the frequency divider 13 appearing in FIG. 1.

The frequency divider 13 is formed of counters 131, 132, an AND gate 133, and an OR gate 134. The counter 131 has a clock input terminal CLK supplied via the output terminal 12T1 of the oscillator 12 with an pulse train from the oscillator 12, and an output terminal Q6 connected to a clock input terminal CLK of the counter 132. The output of the AND gate 133, a frequency-divided output terminal Q6 of the counter 132, and the output terminal 11T3 of the rise timing-controlling circuit 11 are connected to an input of the OR gate 134. Further, the output terminal 11T3 of the rise timing-controlling circuit 11 is also connected to a reset input terminal RST of the counter 131. The counter 132 has a frequency-divided output terminal Q4 connected via an output terminal 13T3 to the sine wave-forming circuit 14. In addition, an input of the AND gate 133 is connected to a 50/60 Hz-changeover circuit 135.

Figure 13:
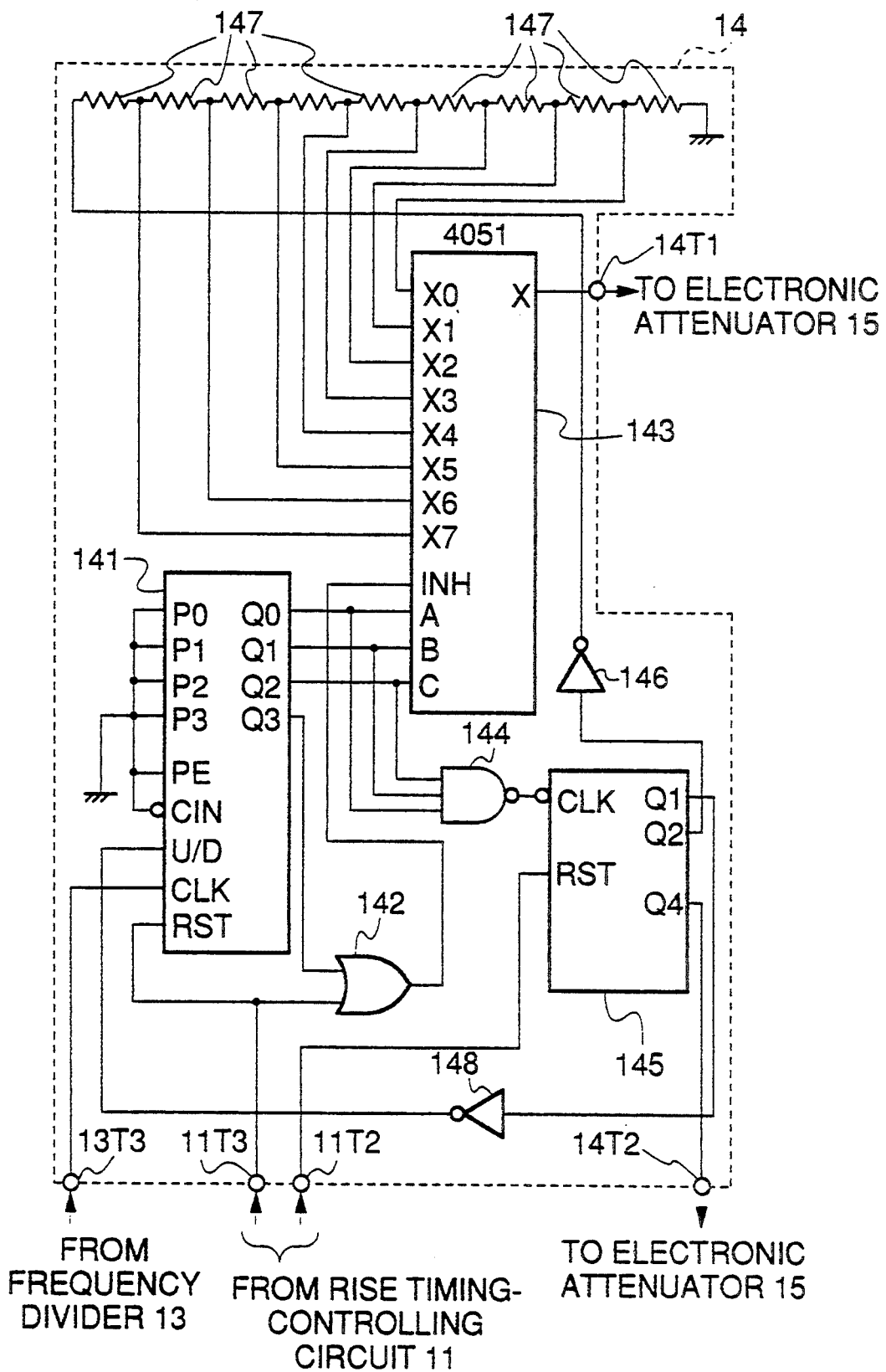
FIG. 13 is a circuit diagram showing details of a sine wave-forming circuit appearing in FIG. 1.

FIG. 13 shows, by way of example, details of the sine wave-forming circuit 14 appearing in FIG. 1.

The sine wave-forming circuit 14 is formed of an up-down counter 141, an OR gate 142, a multiplexer 143 which is formed by a multiplexer such as $\mu$P74HC 4051 sold by NEC Corporation in Japan, a three-input NAND gate 144, a binary counter 145, an invertor 146, a voltage divider 147, and an invertor 148.

The counter 141 has a reset input terminal RST connected via the output terminal 11T3 of the rise timing-controlling circuit 11 to the output terminal Q-bar of the D flip-flop 115 of the rise timing-controlling circuit 11. Further, the counter 141 has an output terminal Q3 connected to an input of an OR gate 142, which is also connected to the output terminal 11T3. The output of the OR gate 142 is connected to an inhibiting input terminal INH of the multiplexer 143. Further, the counter 141 has output terminals Q0 to Q2 connected to terminals A, B, C of the multiplexer 143, respectively, and to an input of the NAND gate 144. The NAND gate 144 has its output connected to a clock input terminal CLK of the counter 145.

The counter 145 has an output terminal Q2 connected via an invertor 146 to one end of the voltage divider 147 formed of a group of resistances. Junctions between adjacent ones of these resistances are connected to input terminals X0 to X7 of the multiplexer 143, respectively, with the other end of the voltage divider being grounded.

The counter 145 has an output terminal Q1 connected via an invertor 148 to an up-down input terminal U/P of the counter 141 for feedback of the output to the latter. The multiplexer 143 has an output terminal X connected via an output terminal 14T1 to the electronic attenuator 15 appearing in FIG. 1, while the counter 145 has an output terminal Q4 also connected via an output terminal 14T2 to the circuit 15. Further, the output terminal 11T2 of the rise timing-controlling circuit 11 shown in FIG. 10 is connected to a reset terminal RST of the counter 145.

This sine wave-forming circuit 14 operates to form one repetition cycle of the aforementioned sine wave signal having a stepped waveform per a predetermined number of pulses of the clock input signal supplied from the frequency divider 13 via its output terminals 13T3.

Figure 14:
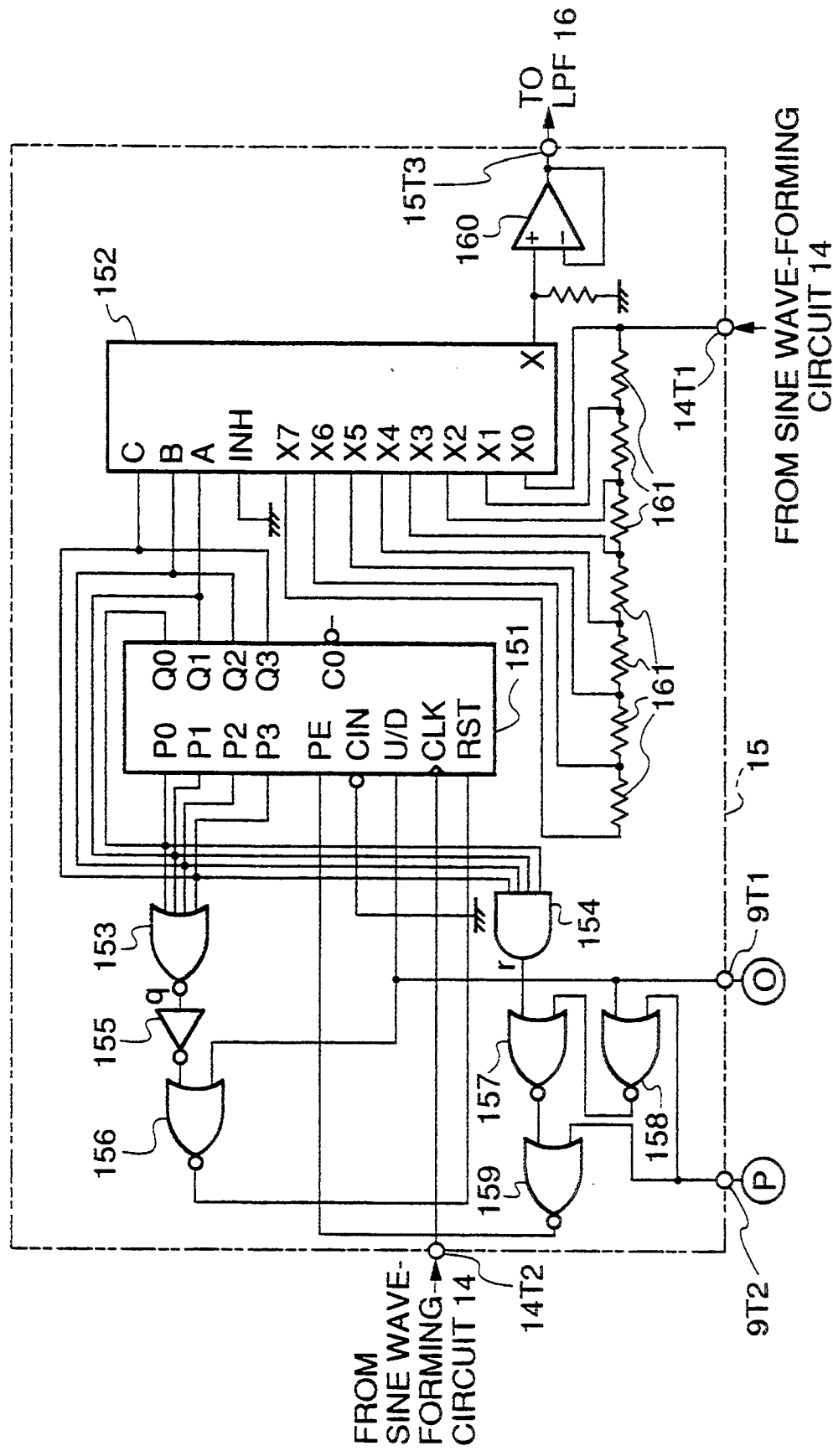
FIG. 14 is a circuit diagram showing details of an electronic attenuator appearing in FIG. 1.

FIG. 14 shows, by way of example, details of the electronic attenuator 15 appearing in FIG. 1.

The electronic attenuator 15 is comprised of an up-down counter 151, a multiplexer (4051) 152, a NOR gate 153, an AND gate 154, an invertor 155, NOR gates 156, 157, 158, 159, an operational amplifier 160, and a voltage divider 161. The electronic attenuator 15 is supplied with the aforementioned target output waveform signal and a clock signal from the sine wave-forming circuit 14 via its output terminals 14T1 and 14T2, respectively. An output from the operational amplifier 160 of the electronic attenuator is supplied via an output terminal 15T3 to the LPF 16. Further, the NOR gates 158, 159 has inputs thereof connected to the output terminal 9T2 of the comparator circuit 9, while the NOR gate 158 has another input thereof also connected to the output terminal 9T1 of the comparator circuit 9. The construction and operation of the electronic attenuator 15 are described in detail in U.S. Ser. No. 07/912,158 filed Jul. 10, 1992 corresponding to Japanese Patent Application No. 3-198401 and assigned to the present assignee, and hence the detailed description thereof is omitted here.

Figure 15:
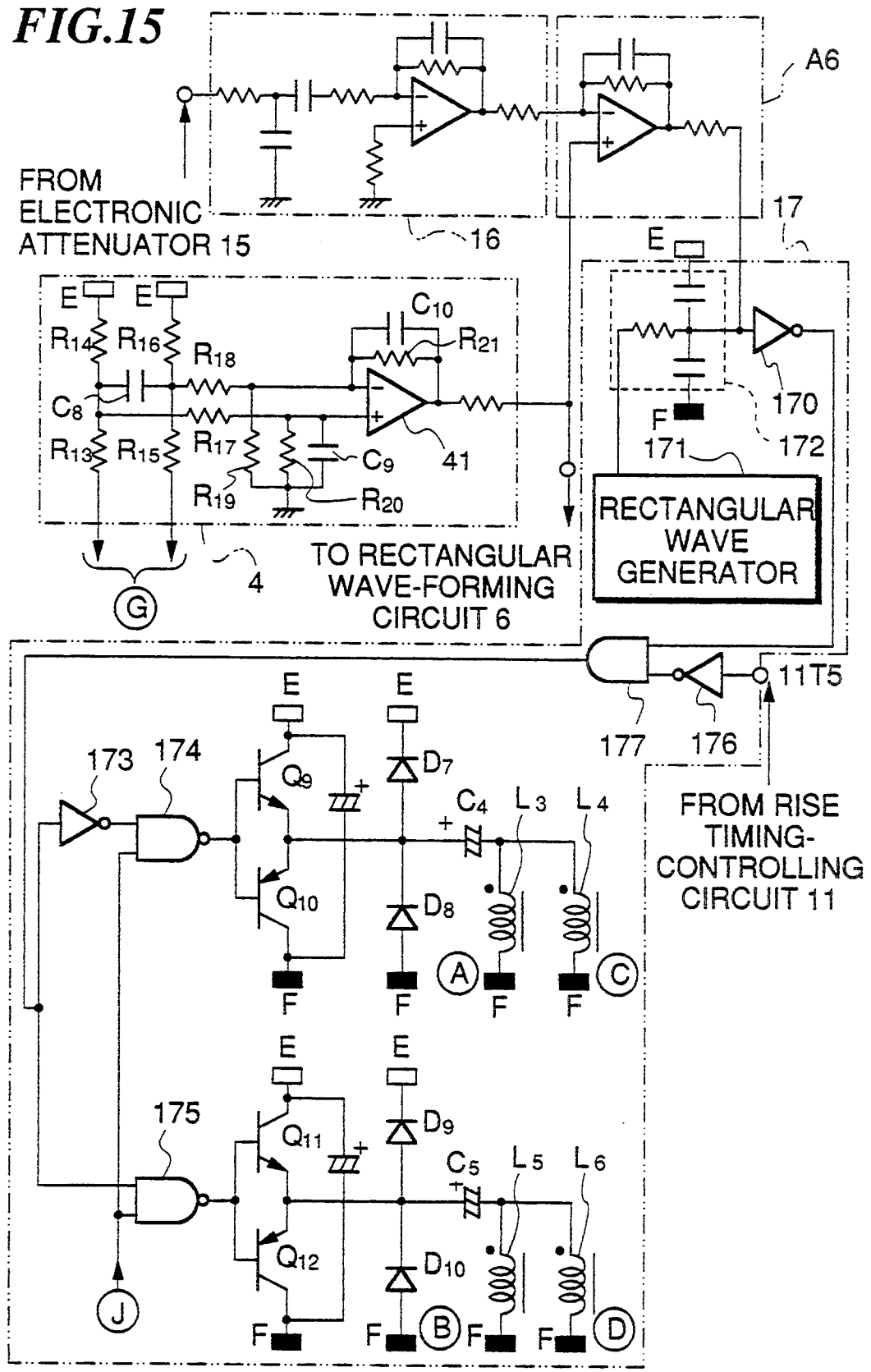
FIG. 15 is a circuit diagram showing details of an LPF, a PWM circuit, and a voltage detector, all appearing in FIG. 1, and a distortion-correcting circuit associated therewith, as further component parts of the generator of FIG. 1.

FIG. 15 shows, by way of example, details of the LPF 16, the PWM circuit 17 and the voltage detector 4.

The output terminal 15T3 of the electronic attenuator 9 is connected to an inverting input terminal of an operational amplifier of the LPF 16. The LPF 16 shapes a stepped sine wave from the electronic attenuator 15 into a smooth sine wave. The output of the LPF 16 is connected to an inverting input terminal of an operational amplifier of a distortion correcting circuit A6. A non-inverting input terminal of this operational amplifier is connected to the output of the voltage detector 4. The distortion correcting circuit A6 corrects the level of the sine wave inputted via the LPF 16 from the electronic attenuator 15, based on an output signal from the voltage detector 4, and generates a corrected sine wave signal.

Reference numeral 171 designates a rectangular wave generator which generates a rectangular wave signal having a frequency much higher than the frequency of the sine wave outputted from the LPF 16. The frequency of the rectangular wave signal is formed by dividing the frequency of a signal having a fixed frequency and formed by the oscillator 12. The rectangular wave generator 171 has its output connected to an integrating circuit 172, which integrates the rectangular wave into a triangular wave signal.

The sine wave signal from the LPF16, which has been corrected by the distortion correcting circuit A6, and the triangular wave signal from the integrating circuit 172 are superposed upon each other, and the superposed signal is then supplied to an invertor buffer (pulse width modulator) 170. The invertor buffer 170 has a predetermined fixed threshold level and operates such that when a signal having a level exceeding the threshold level is inputted, it supplies a low level, while when a signal having a level below the threshold level is inputted, it supplies a high level signal, thus forming a so-called pulse width modulated (PWM) signal. The invertor buffer 170 is formed by an IC having a fixed threshold level relative to the potential at its gate input terminal, e.g. a threshold level of a CMOS gate on the input terminal side.

The output of the invertor buffer 170 is connected via an AND gate 177 and an invertor 173 to one input terminal of a NAND gate 174, and via the AND gate 177 alone to one input terminal of a NAND gate 175. The AND gate 177 will be described later. The other input terminals of the NAND gates 174 and 175 are connected to an output terminal J of a NOR gate A3b of the engine rotational speed-detecting circuit A3 shown in FIG. 4.

The NAND gate 174 has its output connected to a first push-pull amplifier comprised of transistors Q9 and Q10. The transistor Q9 of the first push-pull amplifier has its collector connected to the positive output terminal E of the constant-voltage regulator circuit A1, and the transistor Q10 has its collector connected to the negative output terminal F of the constant-voltage regulator circuit A1.

The output of the first push-pull amplifier is connected to a junction between an anode of a diode D7 and a cathode of a diode D8. The diode D7 has its cathode connected to the positive output terminal E of the constant-voltage regulator circuit A1, while the diode D8 has its anode connected to the negative output terminal F of the regulator circuit A1. The diodes D7, D8 cooperate to damp surging occurring at pulse transformers, hereinafter referred to.

The junction between the anode of the diode D7 and the cathode of the diode D8 is connected to ends of primary coils L3 and L4 of the pulse transformers A, C via a capacitor C4 for cutting off low frequency components. The other ends of the primary coils L3, L4 are connected to the negative output terminal F of the constant-voltage regulator circuit A1. Before passing the capacitor C4, the PWM signal has constant amplitude with respect to a reference level but the average voltage (integrated value) of this signal varies with the same period as the sine wave signal from the LPF 16. Therefore, this PWM signal contains a component of the same frequency as that of the sine wave signal. The capacitor C4 is set to such a constant value that the PWM signal, when passing the capacitor C4, is converted into a pulse train which varies as a whole in reverse phase to the component of the same frequency as that of the sine wave and always has a zero average voltage. This pulse train always having a zero average voltage is applied to the primary coils L3, L4 of the pulse transformers A, C.

The output of the NAND circuit 175 is connected to a second push-pull amplifier comprised of transistors Q11 and Q12, like the first push-pull amplifier. The output of the second push-pull amplifier is connected to a junction between an anode of a diode D9 and a cathode of a diode D10. This junction is also connected to ends of primary coils L5 and L6 of pulse transformers B and D via a capacitor C5 which has the same constant as the capacitor C4.

Referring again to FIG. 5, the driving signal circuit which is connected to the gates of the FET's Q5 to Q8 will be described.

One end of the secondary coil of the pulse transformer A is connected to a gate of the FET Q5 via a resistance R5, a capacitor C6 for reproducing the PWM signal before passing the aforementioned capacitor C4, and a parallel circuit formed by a resistance R6 and a diode D13, while the other end of the secondary coil of the pulse transformer A is connected to a source of the FET Q5. A junction between the capacitor C6 and the parallel circuit formed by the resistance R6 and the diode D13 is connected via a series circuit formed by Zener diodes D5 and D6 to the above other end of the secondary coil of the pulse transformer A. The diode D13 has its anode connected to the gate of the FET Q5, and the Zener diodes D5, D6 have their anodes connected with each other. Provided between a secondary coil of each of the pulse transformers B, C, and D and a gate of a corresponding one of the FET's Q6 to Q8 is the same circuitry as the above described one provided between the secondary coil of the pulse transformer A and the gate of the FET Q5.

The two output lines from the invertor circuit 3a are connected to input terminals G of the voltage detector 4 shown in FIG. 15. Namely, connected to the input terminals G are respective ends of a series circuit formed by a resistance R13 and a resistance R14 and a series circuit formed by a resistance R15 and a resistance R16. On the other hand, the other ends of these series circuits are connected to the positive output terminal E of the constant-voltage regulator circuit A1. A junction between the resistances R13 and R14 and a junction between the resistances R15 and R16 are connected via respective resistances R17 and R18 to a non-inverting input terminal of an operational amplifier 41 and an inverting input terminal of same, respectively, with a capacitor C8 for cutting off high frequency components being connected between these two junctions. The non-inverting input terminal of the operational amplifier 41 is grounded via a capacitor C9 for cutting off high frequency components. The amplifier 41 has its output connected via a resistance to a non-inverting input terminal of the operational amplifier of the distortion correcting circuit A6 and the input of the rectangular wave-forming circuit 6.

Operating modes (A) and (B) of the present generator constructed as above will be described in detail with reference FIG. 16a1 to FIG. 20b.

(A) Starting Operation

In the starting operation, the output power from the present generator is automatically put into phase with the output power from the counterpart generator for parallel operation.

Before describing the parallel operation, single operation, i.e. operating of the present generator will be described. At the start of the single operation, no output voltage is applied to the voltage detector 4, so that the signal b outputted from the operational amplifier of the rectangular wave-forming circuit 6 does not assume a rectangular waveform for controlling the timing of generator starting to generate power having the target output waveform in synchronism therewith. Further, the level of the signal b is indefinite immediately after the start of the present generator, i.e. it is indefinite whether the signal b is at a high level (Hi level) or at a low level (Lo level). In this embodiment, the generator can be started by itself by the rise timing-controlling circuit 11, even if the output signal b from the rectangular wave-forming circuit 6 has no rectangular waveform, and further irrespective of whether it is at Hi level or at Lo level, through starting operation of the generator.

Referring to FIG. 10 and FIG. 16a1 to FIG. 16a10, when the rise timing-controlling circuit 11 is supplied at the input terminal 11T1 with the signal b at Hi level from the rectangular wave-forming circuit 6 (the operation in the case where the signal b is at Lo level will be described hereinafter with reference to FIG. 16b1 to FIG. 16b10), the signal b is inverted by the invertor 111, and supplied as a signal W1 at Lo level to the OR gate 112. On the other hand, when the engine is in stoppage (or before the engine rotational speed reaches a predetermined value), an output signal W2 from the engine rotational speed-detecting circuit A3 is at Lo level, and hence an output signal W3 from the invertor 116, which is at Hi level, is supplied to the reset input terminal R of the D flip-flop 115 and the reset input terminal RST of the binary counter 117 to hold these circuits in a reset state. Then, when the engine has been started so that the engine rotational speed has reached the predetermined value, the output signal W2 from the engine rotational speed-detecting circuit A3 goes high at a time point t1 of FIG. 16a3. Accordingly, the output signal W3 from the invertor 116 goes low and is supplied to the reset input terminal R of the D flip-flop 115 and the reset input terminal RST of the binary counter 117. As a result, the reset state of the D flip-flop 115 and that of the binary counter 117 are canceled.

On the other hand, the clock input terminal CLK of the binary counter 117 is supplied with the pulse train having a frequency of 75 Hz from the outside, so that upon canceling of the reset state, it generates through the output terminal Q2 a signal W5 having a frequency of 9.4 Hz and through the output terminal Q3 a signal W4 having a repetition period twice as large as that of the signal W5 or a frequency of 4.7 Hz. Accordingly, at a time point t2, the OR gate 112 is supplied with the signal W1 at Lo level and the signal W4 at Lo level, and outputs a signal W6 at Lo level. Further, at the time point t2, the NAND gate 113 is supplied with the Lo level signal W6 and the signal W2 at Hi level, so that an output signal W7 from the NAND gate 113 is at Hi level.

As a result, the OR gate 114 is supplied with the Hi level signal W7 and the signal W5 having the frequency of 9.4 Hz, and supplies an output signal W8 which is at Hi level at the time point t2, to the clock input terminal CLK of the D flip-flop 115. On the other hand, the data input terminal D of the D flip-flop 115 is supplied with the aforementioned signal W2 at Hi level, and accordingly the output terminal Q-bar of the D flip-flop 115 outputs a signal W9 at Hi level at the time point t2. Then, the Hi level signal W9 and the signal W3 at Lo level are supplied via the output terminals 11T3, 11T2 to the sine wave-forming circuit 14.

Then, at a time point t3, the signal W4 goes high, so that the output signal W6 from the OR gate 112 goes high and hence the output signal W7 from the NAND gate 113 goes low. At the same time, the signal W5 goes low, so that the output signal W8 from the OR gate 114 goes low. However, the output signal W9 from the D flip-flop 115 remains high.

Then, at a time point t4, the signal W5 goes high, so that the signal W8 from the OR gate 114 goes low and is supplied to the clock input terminal CLK of the D flip-flop 115. The level of the clock input of the D flip-flop 115 thus changes from Lo level to Hi level, and the signal W9 from the Q-bar goes low. As a result, the signal W9 and the signal W3, which are both at Lo level, are supplied via the output terminals 11T3, 11T2 to the sine wave-forming circuit 14 in FIG. 13 to cancel reset states of the counters 141 and 145, initiating the start of the present generator.

FIG. 16b1 to FIG. 16b10 collectively form a timing chart illustrating the operation of the rise timing-controlling circuit 11 when the signal b, which is at Lo level, is supplied from the rectangular wave-forming circuit 6 through the input terminal 11T1 upon starting the generator. The signal b is inverted by the invertor 111 into the signal W1 at Hi level, which is then supplied to the OR gate 112. When the output signal W2 from the engine rotational speed-detecting circuit 3A goes high (at a time point t1 in FIG. 16b3), it cancels the reset states of the D flip-flop 115 and the binary counter 117, in the same manner as described above.

The clock input terminal CLK of the counter 117 is supplied, as described above, with the 75 Hz pulse train from the outside, and the counter 117 outputs through the output terminal Q2 the 9.4 Hz signal W5, and further through the output terminal Q3 the 4.7 Hz signal W4, so that at the time point t1, the OR gate 112 is supplied with the signal W1 at Hi level and the signal W4 at Lo level, which causes the output signal W6 therefrom to remain high. Further, at the time point t1, the NAND gate 113 is supplied with the signal W6 and the signal W2 both at Hi level, which causes the output signal W7 therefrom to go low.

As a result, at the time point t1, the OR gate 114 is supplied with the signal W7 and the signal W5 both at Lo level, and hence the signal W8, which is at Lo level, is supplied to the clock input terminal CLK of the D flip-flop 115. On the other hand, as mentioned above, the data input terminal D of the D flip-flop 115 has been supplied with the signal W2 at Hi level, and hence at the time point t1, the D flip-flop 115 outputs through the output terminal Q-bar the signal W9 at Hi level. The signal W9 at Hi level and the signal W3 at Lo level are supplied via the output terminals 11T3, 11T2 to the sine wave-forming circuit 14.

At a time point t2, the signal W5 goes high, to cause the output signal W8 from the OR gate 114 to go high, and the resulting Hi level signal W8 is supplied to the clock input terminal CLK of the D flip-flop 115. Accordingly, the signal W9 from the Q-bar terminal goes low. As a result, similarly to the case where the output signal b from the rectangular wage-forming circuit 6 is at Hi level, described hereinbefore, the signal W9 and the signal W3 both at Lo level are supplied via the output terminals 11T3, 11T2 to the sine wave-forming circuit 14, initiating the start of the present generator.

Next, the starting operation will be described, by taking example by a case in which the output terminals of the present generator are connected to the output terminals of a counterpart generator which has already been started, and the present generator is started for parallel operation with the counterpart generator. In this case, the present generator is started at such a timing that the waveform of the output voltage from the present generator becomes in phase with the waveform of the output voltage of the counterpart generator which has already started generating power. In the present example, the synchronizing or starting timing is set to a zero crossing point at which the level of the waveform of the output voltage from the counterpart generator changes from the negative side to the positive side. More specifically, the present generator, which is to be started later than the counterpart generator, detects a time point (so-called zero crossing point) at which the level of the output voltage from the counterpart generator having a sinusoidal waveform shown in FIG. 20a crosses the 0 volt level, i.e. changes from a negative volt to a positive volt, and the output voltage from the present generator is started to rise at this time point.

Referring to FIG. 10 and FIG. 16c1 to FIG. 16c10, when the rectangular wave signal b based on the waveform of the output voltage from the counterpart generator is applied to the input terminal 11T1, the signal b is inverted by the invertor 111 to be supplied as the signal W1 to the OR gate 112. Before a time point t1, the OR gate 112 is supplied with the signal W1 which is equal in frequency to the output voltage from the counterpart generator, e.g. 50 Hz, and the signal W4 at Lo level, and hence the output signal W6 from the OR gate 112 has a frequency of 50 Hz.

At the time point t1 when the output signal W2 from the engine rotational speed-detecting circuit 3A goes high, this cancels the reset state of the D flip-flop 115 and that of the binary counter 117. At the same time, the NAND gate 113 is supplied with the signal W6 having the frequency of 50 Hz, which is presently at Hi level, and the signal W2 at Hi level, and hence the output signal W7 therefrom goes low. As a result, at the time point t1, the OR gate 114 is supplied with the signal W7 at Lo level and the signal W5 at Lo level, which causes the output signal W8 therefrom to go low. The Lo level signal W8 is supplied to the clock input terminal CLK of the D flip-flop 115. On the other hand, the data input terminal D of the D flip-flop 115 is then supplied with the signal W2 at Hi level. Therefore, at the time point t1, the signal W9 from the output terminal Q-bar of the D flip-flop 115 assumes Hi level. The Hi level signal W9 level and the Lo level signal W3 are supplied via the output terminals 11T3, 11T2 to the sine wave-forming circuit 14.

At a time point t2, the output voltage from the counterpart generator upwardly crosses the 0 volt level, i.e. it reaches the zero crossing point from negative level to positive level, so that the signal W1 goes low. Therefore, the signal W6 goes low. Consequently, the signal W7 goes high, which causes the signal W8 to go high. The Hi level signal W8 is supplied to the clock input terminal CLK of the D flip-flop 115. As mentioned above, the data input terminal D of the D flip-flop 115 has been supplied with the signal W2 at Hi level. Consequently, at the time point t2, the signal W9 from the output terminal Q-bar of the D flip-flop 115 goes low. The signal W9 and the signal W3 both at Lo level are supplied via the output terminals 11T3, 11T2 to the sine wave-forming circuit 14, initiating the start of the present generator.

In the present embodiment, as described hereinabove, for the purpose of enabling the start of the generator for single operation, the signal W4 having the frequency of 4.7 Hz and the signal W5 having the frequency of 9.4 Hz are used as starting timing signals (self-starting timing signals). According to the invention, to prevent these timing signals from adversely affecting the start of the present generator for parallel operation, the output voltage waveform from the counterpart generator is preferentially detected and used for starting the present generator for parallel operation. More specifically, if the counterpart generator is in operation when the present generator is being started, during which the output signal W2 from the engine rotational speed-detecting circuit 3A goes high, the voltage detector 4 detects an output voltage waveform having e.g. a frequency of 50 Hz from the counterpart generator to supply the signal b as a rectangular wave signal b having a frequency of 50 Hz as shown in FIG. 16c1 to the invertor 111. Since the frequencies of the starting timing signals W4, W5 are set to lower values than the frequency of the rectangular waveform signal b, the OR gates 112, 114 operate to output the output signals W6, W8 based upon the 50-Hz signal with preference to the starting timing signals W4, W5, as shown in FIG. 16c7 and FIG. 16c9.

(B) Normal Operation After Start

During parallel operation after the start of the generator, self-adjustment is performed to correct a difference in phase between the output voltage from the present generator and the output voltage from the counterpart generator, both already started, i.e. a difference in phase between the voltage detected by the voltage detector 4 and the current detected by the current detector 5, in the following manner:

First, when there is no difference in phase between the output voltage and the output current detected, the phase difference detector 8, the operation of which will be described in detail hereinafter with reference to FIG. 9, generates signals both at Hi level via the output terminals 8T3, 8T4. When there is a difference in phase between them, the detector 8 supplies a pulse-train signal via the output terminal 8T3 in the case of the current lagging behind the voltage, and it supplies a pulse-train signal via the output terminal 8T4 in the case of the current leading the voltage. These output signals are supplied via the output terminals 8T3 and 8T4 to the oscillator 12 shown in FIG. 11.

Referring to FIG. 11, an oscillating pulse signal (5 MHz) from the VCO 121 in the oscillator 12 is inverted by the invertor 122 into a clock signal CLK-bar shown in FIG. 17a, which is supplied to the clock input terminal CLK of the counter 123. Consequently, the counter 123 outputs via its output terminal Q1 a signal F1 (2.5 MHz), shown in FIG. 17b, having half the frequency of the oscillating pulse signal. Further, it outputs via its output terminal Q1 a signal F10 (approximately 5 KHz) obtained by dividing the frequency of the signal F1 by 512.

The signal F1 is supplied to an input of the NOR gate 126 and the clock input terminals CLK of the D flip-flops 129b, 129d, whereas the signal from the output terminal Q10 of the counter 123 is supplied to an input of the AND gate 129a. Further, the output from the invertor 122, i.e. the clock signal CLK-bar, is inverted by the invertor 124 into a signal F2, i.e. an inverted signal of the clock signal CLK-bar. This signal F2 and the above signal F1 are supplied to the NOR gate 126, which in turn outputs a signal F3 (2.5 MHz) as shown in FIG. 17d.

If there is no difference in phase between the detected output voltage and the detected output current, and hence the phase difference detector 8 supplies Hi level signals through both the output terminals 8T3, 8T4, and input terminals of the OR gates 129f, 129g are supplied with corresponding ones of the Hi level signals. Accordingly, irrespective of whether the output from the NAND gate 129e (output from the one-shot multivibrator 129A) is at Hi level or at Lo level, the outputs from the OR gates 129f, 129g are held at Hi level. Namely, a signal F6 supplied to one input terminal of the NAND gate 128 and a signal supplied to one input terminal of the NOR gate 125 are both at Hi level. As a result, an output signal F4 from the NOR gate 125 is held at Lo level, irrespective of the level of the signal F2. Therefore, an output signal F5 from the OR gate 127, which is just the same as the signal F3, is supplied to the NAND gate 128.

At this time, the other input terminal of the NAND gate 128 is supplied with the signal F6 at Hi level as mentioned above, and hence an output signal F7 from the NAND gate 128, which is inverted relative to the signal F3, is supplied as the output from the oscillator 12 via the output terminal 12T1 to the frequency divider 13.

Thereafter, this signal F7, as described hereinbefore, is supplied, while being processed, via the frequency divider 13, the sine wave-forming circuit 14, the electronic attenuator 15, the LPF 16, and the PWM circuit 7, and the invertor/LPF 3. Therefore, alternating current power can be obtained, which has a sinusoidal waveform based on the signal F7, which is outputted via its output terminals T1, T1'.

However, in actual parallel operation, the output voltage from the present generator and that from the counterpart generator are not continuously in phase with each other with the same frequency. Therefore, phase adjustment is performed during the parallel operation to finely synchronize the phases of the output voltages e.g. within a frequency range of 50 Hz ±0.1 Hz. The phase-adjusting operation of the present generator will now be described.

In the present embodiment, the phase adjustment is carried out by adding or subtracting a new pulse to or from the aforementioned signal F3 shown in FIG. 17d every predetermined number of pulses (once per 500 pulses). Namely, when the current lags behind the voltage, a new pulse is added to the basic pulse signal F3 to slightly increase the frequency, whereas when the current leads the voltage, a pulse is subtracted from the signal F3 to slightly decrease the frequency. This operation will be described in further detail in the following:

(B-1) Adjusting Operation When the Current Lags

When a difference in phase occurs between the output voltage from the present generator and that from the counterpart generator during parallel operation, there also occurs a difference in phase between the voltage detected by the voltage detector 4 and the current detected by the current detector 5. For example, when the current detected lags behind the voltage detected, the following adjustment is carried out.

When the current lags, the rectangular wave signal b and the rectangular wave signal b' as shown in FIGS. 18a1 and 18a2 are supplied to the phase difference detector 8 shown in FIG. 9 through the input terminals 8T1, 8T2, respectively. Then, the XOR 81 outputs a signal S81 having a pulse duration corresponding to the phase difference between the two signals b and b', as shown in FIG. 18a3, thus detecting the degree of difference in phase between the signals b, b'. The signal S81 is applied to the clock input terminal CLK of the D flip-flop 84 and one input terminal of the NAND gate 87 and one input terminal of the NAND gate 88. At the same time, the signal b' is retarded by the buffer 82 and the capacitor 83 and then applied to the data input terminal D of the D flip-flop 84.

The retardation of the signal b' by the buffer 82 and the capacitor 83 is carried out for the purpose of avoiding an unfavorable inaccurate output from the output terminal Q-bar of the D flip-flap 84, which is obtained when the signal b' is supplied to the data input terminal D of the D flip-flop 84 before the signal S81 is supplied as a clock signal to the D flip-flop 84.

Figure 4:
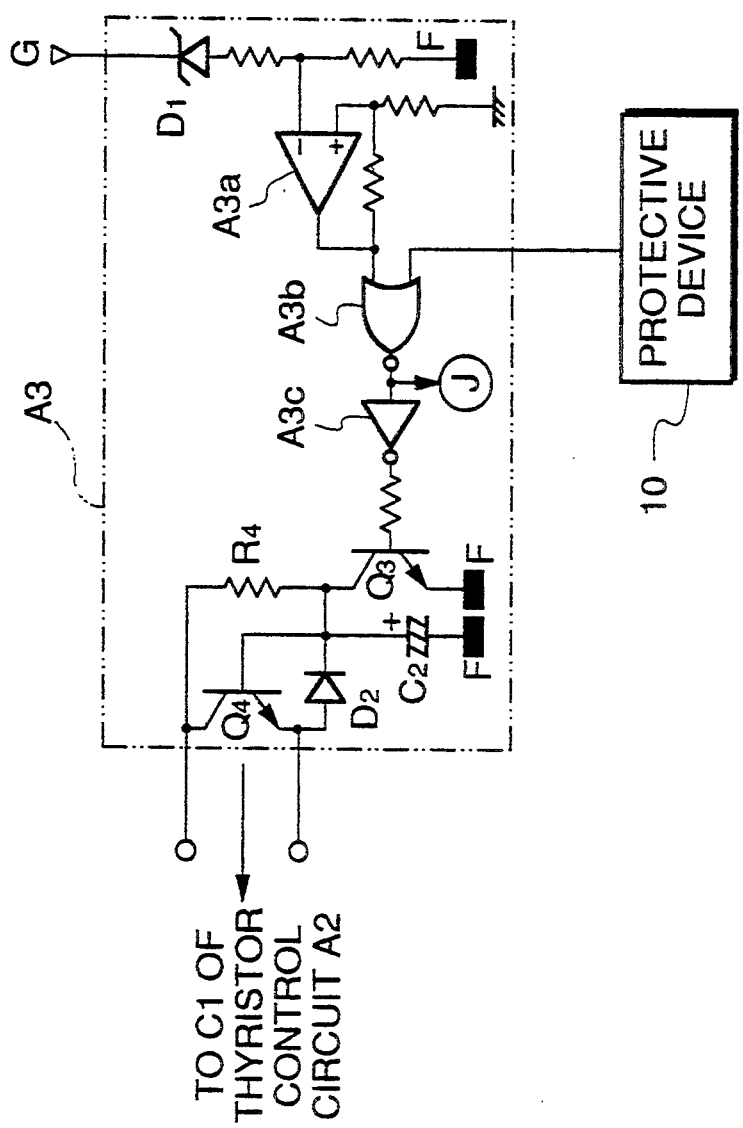
FIG. 4 is a circuit diagram showing an example of an engine rotational speed-detecting circuit, etc., as other component parts of the generator of FIG. 1.

The output terminal Q-bar of the D flip-flop 84 supplies a signal SQ-bar advanced in phase of the signals b, b', i e the signal b in the present case, as shown in FIG. 18a4. Accordingly, both the input terminals of the XOR 85 are supplied with pulse trains identical with the signal b, which causes the XOR 85 to generate a signal S85 at Lo level as shown in FIG. 18a5, which is then applied via the invertor 86 to the other input terminal of the NAND gate 87, and directly to the other input terminal of the NAND gate 88.

Accordingly, the NAND gate 87 outputs a signal 87 having a pulse duration corresponding to the phase difference between the signals b and b', as shown in FIG. 18a6, which has e.g. a frequency of 100 Hz. On the other hand, the NAND gate 88 generates a signal S88 which is held at Hi level, as shown in FIG. 18a7. The output signals S87, S88 from the NAND gates 87, 88 are applied through the input terminals 8T3, 8T4 to the oscillator 12 in FIG. 11.

Referring to FIG. 11, when the output signals S87, S88 from the NAND gates 87, 88 of the phase difference detector 8 are supplied through the output terminals 8T3, 8T4 to the oscillator 12, the OR gate 129f of the oscillator 12 is supplied at its one input with the Hi level signal S88, so that the signal F6 from the OR gate 129f is held at Hi level, irrespective of the level of the output from the NAND gate 129e (i.e. the output from the one-shot multivibrator 129A).

On the other hand, the signals S87, S88 from the phase difference detector 8 are also supplied to the NAND gate 129h. Accordingly, this gate outputs a signal (100 Hz) inverted relative to the signal S87, which is then applied to one input terminal of the AND gate 129a. The other input terminal of the AND gate 129a is supplied, as described hereinbefore, with the frequency-divided signal F10 ("approximately 5 KHz", hereinafter referred to as "5 KHz") obtained by dividing the signal F1 by 512, and hence the AND gate 129a generates an output corresponding to the conjunction (AND) of the 100 Hz pulse signal and the 5 KHz pulse signal, which are greatly different in frequency from each other. Therefore, the AND gate 129a outputs a 5 KHz signal in synchronism with the signal F10, during each time period (hereinafter referred to as "phase-adjusting time period") corresponding to the pulse duration of the 100 Hz signal from the NAND gate 129h, i.e. whenever the output from the NAND gate 129h is at Hi level. The output pulse signal from the AND gate 129a is supplied to the one-shot multivibrator (D flip-flop 129b) 129A, and then an output from the one-shot multivibrator (output from the NAND gate 129e) is supplied to one input terminal of the OR gate 129g. The one-shot multivibrator 129A is supplied, as described above, with the signal F1 (2.5 MHz) as the clock input signal, and hence outputs a one-shot pulse at Lo level having a duration corresponding to the clock input (one repetition cycle) of the signal F1 every repetition cycle of the 5 KHz signal from the AND gate 129a, during the phase-adjusting time period. At this time, the other input terminal of the OR gate 129g is supplied with the signal S87 (100 Hz) at Lo level. The resulting output signal F4 from the NOR gate 125 connected to the output of the OR gate 129g goes high twice or forms two pulses at Hi level in a manner corresponding to the above one-shot pulse, as indicated by P1 in FIG. 19a2. These signals F3, F4 are supplied to the OR gate 127, which in turn outputs a signal F5, which is composed of the signal F3 and one of the two pulses P1.

Thereafter, the signal F5 and the signal F6 at Hi level are both supplied to the NAND gate 128, which in turn supplies an output signal F7 which is inverted relative to the signal F5 to the frequency divider 13 via the output terminal 12T1. The signal F7 is divided by the frequency divider 13, and then converted by the sine wave-forming circuit 14 into a sinusoidal wave signal, in which the above addition of the pulse P1 is reflected. More specifically, with an increase in the number of clock input pulses supplied to the sine wave-forming circuit 14, one repetition cycle of the sine wave signal with a stepped waveform is shortened, so that the phase of the target output waveform is advanced accordingly. The resulting sinusoidal wave signal is supplied via the electronic attenuator 15 and the LPF 16 to the PWM circuit as the target output waveform signal which is slightly increased in frequency and hence slightly advanced in phase, and accordingly the invertor/LPF 3 supplies alternating current power having the target output waveform via the output terminals T1, T1' to the load.

(B-2) Adjusting Operation When Current Leads

When the current leads, i.e. the phase of the current detected by the current detector 4 is advanced relative to the phase of the voltage detected by the voltage detector 5, the following adjusting operation is performed:

When the detected current is advanced in phase, the rectangular wave signal b and the rectangular wave signal b' as shown in FIG. 18b1 and FIG. 18b2 are supplied to the phase difference detector 8 shown in FIG. 9, via the input terminals 8T1, 8T2, respectively. As a result, the XOR 81 outputs the signal S81 as shown in FIG. 18b3, while the D flip-flop 84 outputs via its output terminal Q-bar the signal SQ-bar advanced in phase of the signals b, b', i.e. the signal b' in the present case, as shown in FIG. 18b4. Further, the XOR 85 outputs the signal S85 at Hi level as shown in FIG. 18b5.

Accordingly, the NAND gate 88 outputs the signal S88 having a pulse duration corresponding to the phase difference between the signals b and b' as shown in FIG. 18b7, which has e.g. a frequency of 100 Hz. On the other hand, the signal S87 from the NAND gate 87 is held at Hi level. The output signals S87, S88 from the NAND gates 87, 88 are supplied via the output terminals 8T3, 8T4 to the oscillator 12 in FIG. 11.

Referring to FIG. 11, when the output signals S87, S88 from the NAND gates 87, 88 of the phase difference detector 8 are supplied via the input terminals 8T3, 8T4, the OR gate 129g of the oscillator 12 is supplied with the signal S87 from the NAND gate 87, which is held at Hi level, and hence the output signal from the OR gate 129g is held at Hi level, irrespective of the output level from the NAND gate 129e (i.e. the output from the one-shot multivibrator 129A).

On the other hand, the signals S87, S88 from the phase difference detector 8 are also supplied to the NAND gate 129h. Accordingly, this gate outputs a signal (100 Hz) inverted relative to the signal S88, which is then applied to the one input terminal of the AND gate 129a. The other input terminal of the AND gate 129a is supplied, similarly to the case of lagging of the current phase described hereinbefore, with the signal having a frequency of approximately 5 KHz, and hence the AND gate 129a outputs the conjunction (AND) of the 100 Hz pulse signal and the approximately. 5 KHz pulse signal, which are greatly different in frequency from each other. The output from the one-shot multivibrator (output from the NAND gate 129e), which is similar to that obtained when the detected current lags the detected voltage, is supplied to one input terminal of the OR gate 129f. At the same time, the other input terminal of the OR gate 129f is supplied with the signal S88 (100 Hz) at Lo level. As a result, the output signal F6 from the NOR gate 129f becomes identical with the output from the one-shot multivibrator 129A, and hence goes low at such timing as indicated by P2 in FIG. 19b4.

On the other hand, the output signal from the OR gate 129g is then held at Hi level as described above, the output signal F4 from the NOR gate 125 is held at Lo level and applied to the one input terminal of the OR gate 127. The other input terminal of the OR gate 127 is supplied with the above-mentioned signal F3, and hence the output signal F5 from the OR gate 127 becomes identical with the the signal F3, as shown in FIG. 19b3. The signal F5 and the above-mentioned signal F6 are supplied to the NAND gate 128, which in turn outputs the signal F7, which is obtained by subtracting the pulse P2 from the signal F3. This subtraction is carried out during the aforementioned phase-adjusting time period.

Thereafter, the signal F7 is supplied to the frequency divider 13 via the output terminal 12T1. The signal F7 is divided by the frequency divider 13, and then converted into a sinusoidal wave signal, in which the above subtraction of the pulse P2 is reflected. More specifically, with a decrease in the number of clock input pulses supplied to the sine wave-forming circuit 14, one repetition cycle of the sine wave signal with a stepped waveform is prolonged, and hence the phase of the target output waveform is retarded accordingly. The resulting sinusoidal wave signal is supplied via the electronic attenuator 15 and the LPF 16 to the PWM circuit 30 as the target output waveform signal which is slightly decreased in frequency, and accordingly the invertor/LPF 3 supplies alternating current power having the target output waveform via the output terminals T1, T1 to the load.

As described heretofore, according to the present embodiment, the XOR 81 detects to degree of difference in phase between the output current and the output voltage, i.e. an amount of advancement in phase or an amount of lag in phase, and the XOR 85 determines whether the signal indicative of the detected current leads or lags the signal indicative of the detected voltage. This determination of the phase difference is carried out every half cycle of the waveforms, which enables to detect a difference in phase over a range of −180° to +180°. Then, when the signal b′ indicative of the detected output current lags the signal b indicative of the detected output voltage, the NAND gate 87 generates the phase difference signal S87 adapted for correcting the lagging current phase, whereas when the former leads the latter, the NAND gate 88 generates the phase difference signal S88 adapted for correcting the leading current phase. Accordingly, the oscillator 12 increases or decreases the frequency of the basic pulse signal according to the pulse width indicative of the phase difference detected by the XOR 81, enabling a highly accurate frequency adjustment.

What is claimed is:

1. In a generator unit including an alternating current generator, a direct current power source circuit for rectifying and smoothing an output from said alternating current generator into a direct current power and outputting said direct current power, and an invertor circuit for converting said direct current power from said direct current power source circuit into an alternating current power having a predetermined frequency, said generator unit being connectible with at least one generator unit for parallel operation therewith, the improvement comprising:

target waveform-forming means for forming a signal indicative of a target output waveform for said alternating current power having said predetermined frequency, said signal serving as a reference sinusoidal signal for switching operation of said invertor circuit;

output voltage-detecting means for detecting voltage of said alternating current power from said invertor circuit;

output current-detecting means for detecting current of said alternating current power from said invertor circuit;

phase difference-detecting means for detecting a difference in phase between said voltage detected by said output voltage-detecting means and said current detected by said output current-detecting means, and outputting a phase difference signal indicative of the detected phase difference;

reference pulse signal-forming means responsive to said phase difference signal from said phase difference-detecting means for forming a reference pulse signal for varying a frequency of said signal indicative of said target output waveform in a manner such that said phase difference detected by said phase difference-detecting means is decreased; and a start timing-controlling circuit for causing said target waveform-forming means to output said signal indicative of said target output waveform at a timing dependent on a waveform of said voltage when said voltage is detected upon starting of operation of said invertor circuit, while causing said target waveform-forming means to output said signal indicative of said target output waveform at timing independent of said waveform of said voltage when said voltage is not detected upon starting of operation of said invertor circuit.

2. A generator unit according to claim 1, wherein said start timing-controlling circuit determines both said timing dependent on said waveform of said voltage detected by said output voltage-detecting means and said independent timing, and operates on both of said dependent timing and said independent timing to actuate said target output waveform-forming means, upon starting of operation of said invertor circuit, said independent timing having a frequency lower than said predetermined frequency of said voltage detected by said output voltage-detecting means.

3. A generator unit according to claim 1, wherein said reference pulse signal-forming means generates said reference pulse signal in a manner such that a new pulse is added to a reference pulse train having a predetermined frequency for forming said reference pulse signal when said current detected by said output current-detecting means lags in phase relative to said voltage detected by said output voltage-detecting means, whereas a pulse is subtracted from said reference pulse train for forming said reference pulse signal when said current detected by said output current-detecting means leads in phase said voltage detected by said output voltage-detecting means, whereby said frequency of said target output waveform is varied so as to decrease said difference in phase between current detected by said output current-detecting means and said voltage detected by said output voltage-detecting means.

4. A generator unit according to claim 3, wherein said reference pulse signal-forming means adds said new pulse to or subtracts said new pulse from said reference pulse train at predetermined intervals of time.

5. A generator unit according to claim 2, wherein said reference pulse signal-forming means generates said reference pulse signal in a manner such that a new pulse is added to a reference pulse train having a predetermined frequency for forming said reference pulse signal when said current detected by said output current-detecting means lags in phase relative to said voltage detected by said output voltage-detecting means, whereas a pulse is subtracted from said reference pulse train for forming said reference pulse signal when said current detected by said output current-detecting means leads in phase said voltage detected by said output voltage-detecting means, whereby said frequency of said target output waveform is varied so as to decrease said difference in phase between current detected by said output current-detecting means and said voltage detected by said output voltage-detecting means.

* * * * *